United States Patent
Hsu et al.

(10) Patent No.: US 8,126,127 B2
(45) Date of Patent: Feb. 28, 2012

(54) METHOD AND APPARATUS FOR PROVISION OF BROADCAST SERVICE INFORMATION

(75) Inventors: Raymond T. Hsu, San Diego, CA (US); Ragulan Sinnarajah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/051,774

(22) Filed: Jan. 16, 2002

(65) Prior Publication Data

US 2003/0134622 A1    Jul. 17, 2003

(51) Int. Cl.
*H04M 3/42* (2006.01)
*H04M 3/493* (2006.01)
*H04W 24/00* (2009.01)

(52) U.S. Cl. ............. 379/201.05; 455/414.1; 455/456.1
(58) Field of Classification Search .............. 455/403, 455/414.1, 414.2, 414.3, 414.4, 422.1, 436, 455/3.01, 3.02, 3.03, 3.04, 3.05, 3.06, 414; 370/352
See application file for complete search history.

(56) References Cited

U.S. PATENT DOCUMENTS

| | | | |
|---|---|---|---|
| 5,101,501 A | 3/1992 | Gilhousen et al. | 455/442 |
| 5,969,634 A * | 10/1999 | Takashima et al. | 340/7.34 |
| 6,108,706 A | 8/2000 | Birdwell et al. | 709/229 |
| 6,389,271 B1 * | 5/2002 | Kaneko | 455/185.1 |
| 6,529,526 B1 | 3/2003 | Schneidewend | |
| 6,557,171 B1 * | 4/2003 | Sonoda et al. | 725/136 |
| 6,826,176 B1 * | 11/2004 | Siddiqui et al. | 370/352 |
| 6,980,820 B2 * | 12/2005 | Sinnarajah et al. | 455/515 |
| 7,061,880 B2 * | 6/2006 | Basilier | 370/312 |
| 7,092,383 B2 * | 8/2006 | Gaiser et al. | 370/352 |
| 7,099,285 B1 * | 8/2006 | Kanuri et al. | 370/254 |
| 7,167,486 B2 * | 1/2007 | Cornelius et al. | 370/467 |
| 7,240,113 B1 * | 7/2007 | Barry et al. | 709/225 |
| 7,242,919 B2 * | 7/2007 | Kim et al. | 455/313 |
| 7,254,409 B2 * | 8/2007 | Sato et al. | 455/466 |
| 7,308,278 B2 * | 12/2007 | Park | 455/503 |
| 7,310,496 B2 * | 12/2007 | Schill et al. | 455/3.04 |
| 7,339,927 B1 * | 3/2008 | Christenson | 370/389 |
| 7,436,825 B2 * | 10/2008 | Jeong et al. | 370/386 |

(Continued)

FOREIGN PATENT DOCUMENTS

EP    0828355 A2    3/1998

(Continued)

OTHER PUBLICATIONS

International Preliminary Examination Report-PCT/US2003/001540, International Preliminary Examination Report, 6 pages, Alexandria, Virginia Apr. 19, 2004.

(Continued)

*Primary Examiner* — Joseph T Phan
(74) *Attorney, Agent, or Firm* — Darren M. Simon

(57) ABSTRACT

A method and apparatus for the provision of broadcast service information is disclosed. In a wireless communication system supporting a broadcast service, a service ID is provided to identify the broadcast service. The service ID is sent to a base station. The base station configures a broadcast service parameters message that includes the service ID. The base station then transmits the broadcast service parameters message to a mobile station. The mobile station receives the broadcast service parameters message and uses the service ID in the broadcast service parameters message to determine availability of the broadcast service in an adjacent sector.

27 Claims, 20 Drawing Sheets

U.S. PATENT DOCUMENTS

| | | | |
|---|---|---|---|
| 7,437,178 B2 * | 10/2008 | Jeong et al. | 455/525 |
| 7,450,933 B2 * | 11/2008 | Kwak et al. | 455/414.1 |
| 7,561,880 B2 * | 7/2009 | Moon et al. | 455/436 |
| 7,565,138 B2 * | 7/2009 | Kim et al. | 455/414.3 |
| 2002/0102967 A1 * | 8/2002 | Chang et al. | 455/414 |
| 2003/0054807 A1 * | 3/2003 | Hsu et al. | 455/414 |

FOREIGN PATENT DOCUMENTS

| | | |
|---|---|---|
| EP | 1185125 A1 * | 3/2002 |
| GB | 2346512 A | 8/2000 |
| JP | 2001156936 | 6/2001 |
| JP | 2001306937 | 11/2001 |
| JP | 2001320340 | 11/2001 |
| KR | 19980070638 | 10/1998 |
| KR | 20000035074 | 6/2000 |
| KR | 20010004512 | 1/2001 |
| WO | 99/66670 | 12/1999 |
| WO | 01/80590 A1 | 10/2001 |
| WO | 0189147 | 11/2001 |

OTHER PUBLICATIONS

International Search Report-PCT/US2003/001540, International Searching Authority-European Patent.

* cited by examiner

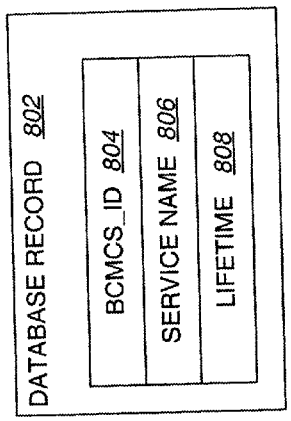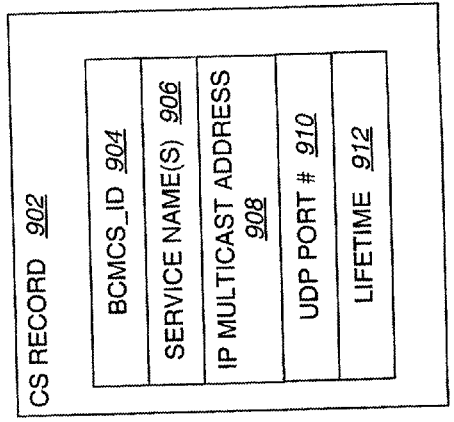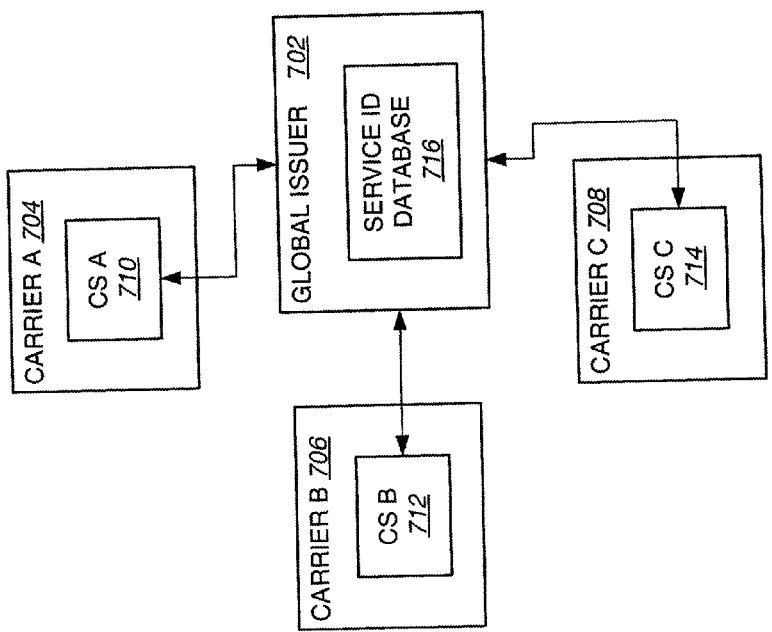

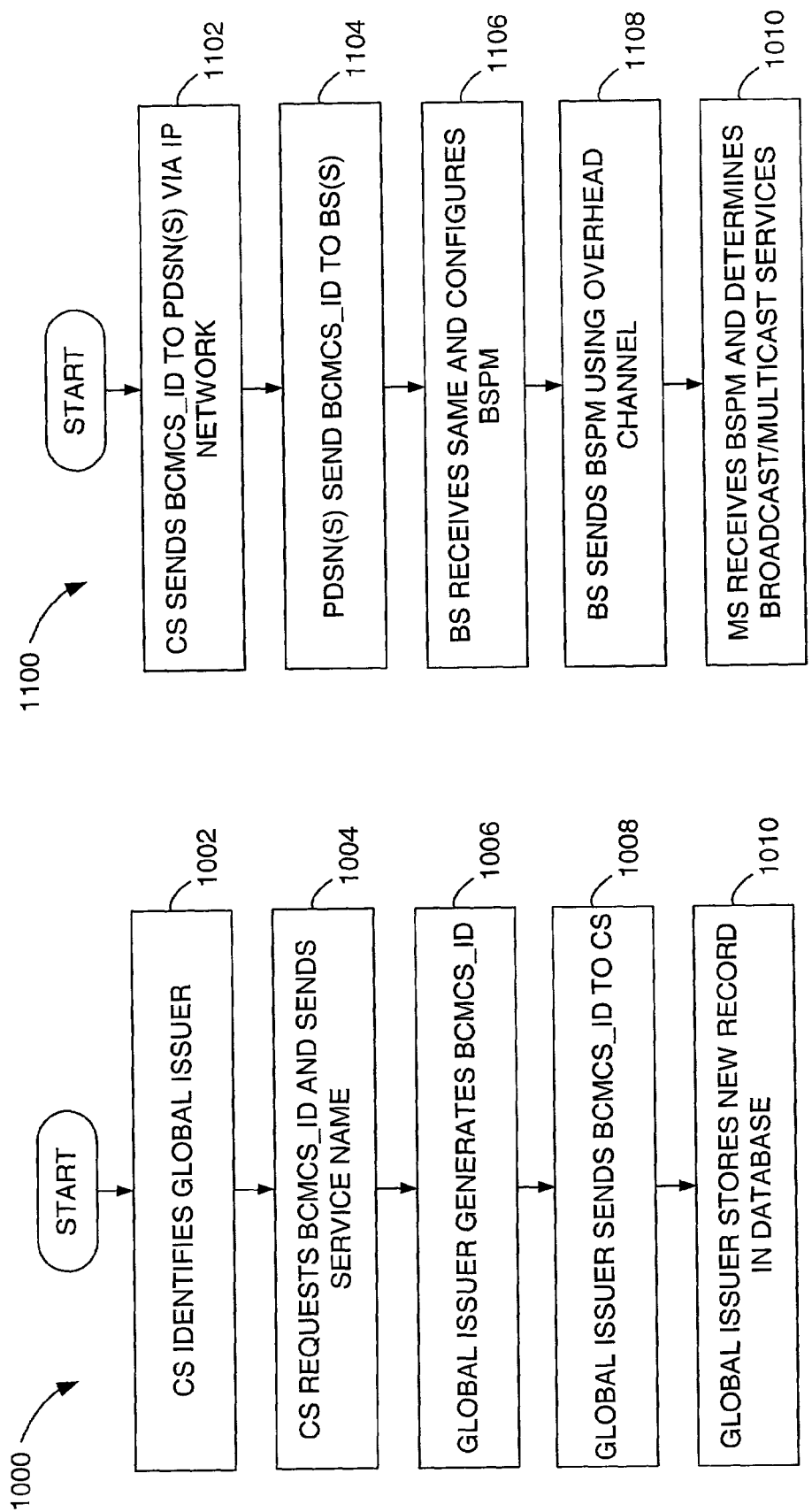

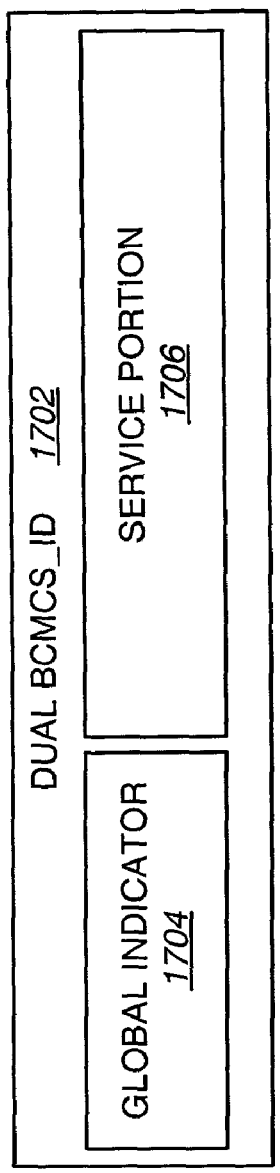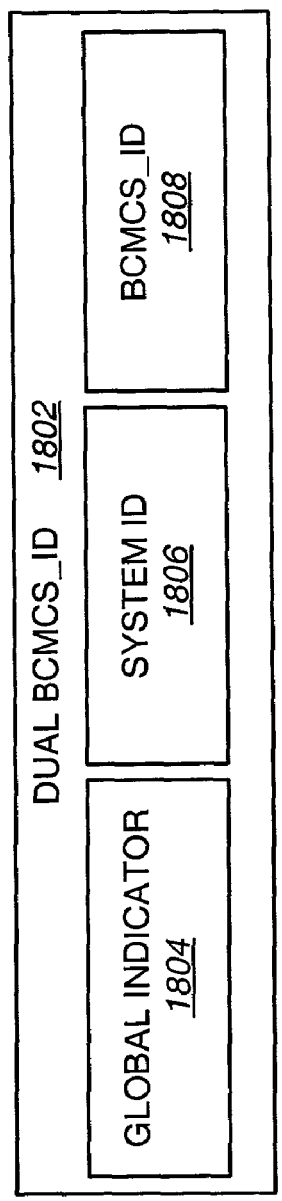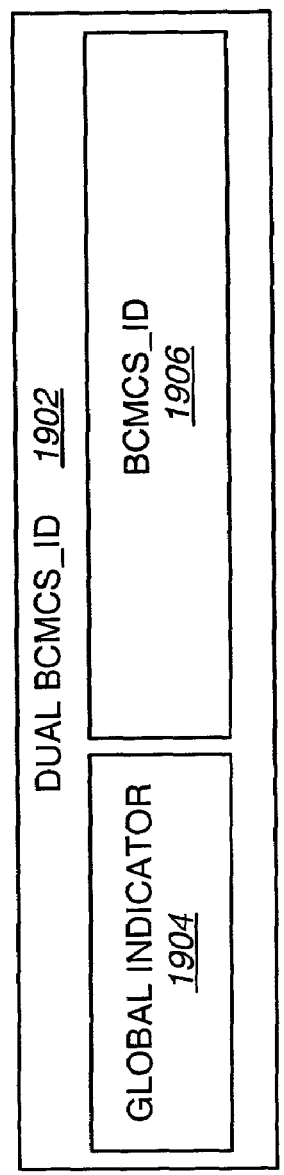

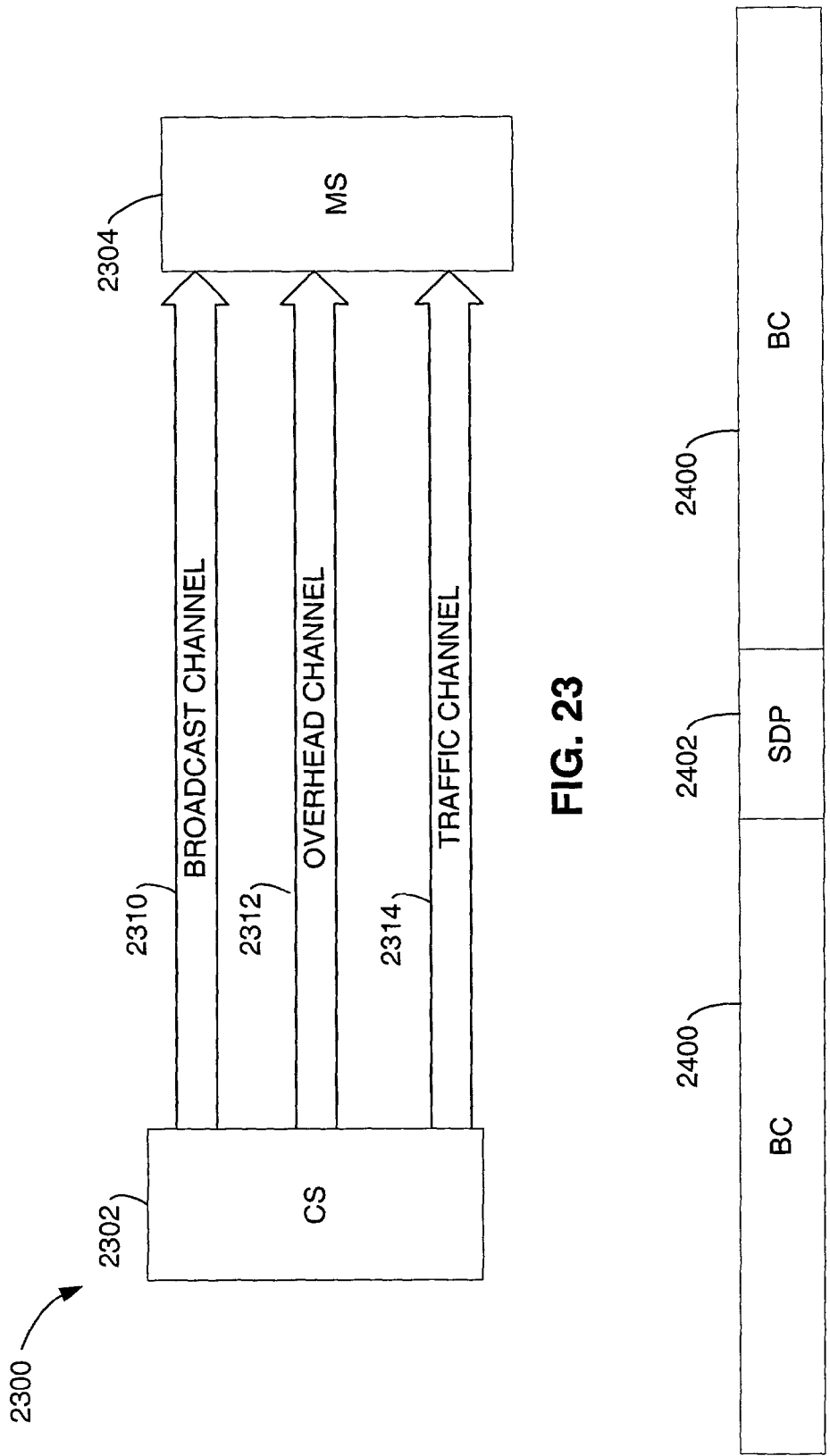

| | |
|---|---|
| NGHBR_PN | 9 |
| NGHBR_HSBS_CONFIG | 3 |
| NGHBR_BCMCS_ID_MAPPING_INCL | 0 OR 1 |
| NGHBR_BCMCS_ID | 0 OR 32 |
| NGHBR_FBSCH_ID | 0 OR 3 |
| NGHBR_FBSCH_FREQ_INCL | 0 OR 1 |
| NGHBR_FBSCH_FREQ | 0 OR 11 |
| NGHBR_FBSCHCODECHANINCL | 0 OR 1 |
| NGHBR_FBSCH_CODE_CHAN | 0 OR 11 |
| NGHBR_FBSCH_PARAMS_INCL | 0 OR 1 |
| NGHBR_FBSCH_RC | 0 OR 5 |
| NGHBR_FBSCH_RATE | 0 OR 4 |
| NGHBR_FBSCH_FRAME_SIZE | 0 OR 2 |
| NGHBR_FBSCH_FRAMEREPIND | 0 OR 1 |

FIG. 29

METHOD AND APPARATUS FOR PROVISION OF BROADCAST SERVICE INFORMATION

BACKGROUND

1. Field

The present invention relates to wireless communication systems generally and specifically, to methods and apparatus for providing broadcast service information.

2. Background

There is an increasing demand for packetized data services over wireless communication systems. As traditional wireless communication systems are designed for voice communications, the extension to support data services introduces many challenges. Specifically, provision of uni-directional services, such as broadcast service where video and audio information is streamed to a subscriber, has a unique set of requirements and goals. Such services may have large bandwidth requirements, wherein system designers seek to minimize transmission of overhead information. Additionally, specific information is needed to forward and/or access the broadcast transmissions, such as processing parameters and protocols. A problem exists in transmitting the broadcast-specific information while optimizing use of available bandwidth.

There is a need, therefore, for an efficient and accurate method of transmitting data in a wireless communication system. Further, there is a need for an efficient and accurate method of providing service-specific information.

BRIEF DESCRIPTION OF THE DRAWINGS

FIG. 7 is a network block diagram illustrating a global issuer issuing service IDs to content servers.

FIG. 8 is a block diagram of an embodiment of a record that may be used in a BCMCS_ID database.

FIG. 9 is a block diagram of an embodiment of a CS record that may be used by the content server.

FIG. 10 is a flow diagram of a content server obtaining a BCMCS_ID from a global issuer.

FIG. 11 is a flow diagram of a method for advertising the availability of certain broadcast/multicast services.

FIG. 17 is a block diagram of an embodiment of a dual BCMCS_ID.

FIG. 18 is a block diagram of an embodiment of a dual BCMCS_ID with a global indicator of zero.

FIG. 19 is a block diagram of an embodiment of a dual BCMCS_ID with a global indicator of one.

FIG. 23 is a block diagram illustrating the various channels used for transmission in a broadcast system.

FIG. 24 is a broadcast stream with overhead information interleaved with broadcast content.

FIG. 29 is a partial block diagram of an embodiment of a BSPM including a NGHBR_BCMCS_ID_MAPPING_INCL field and a NGHBR_BCMCS_ID field.

DETAILED DESCRIPTION

Figure 1:
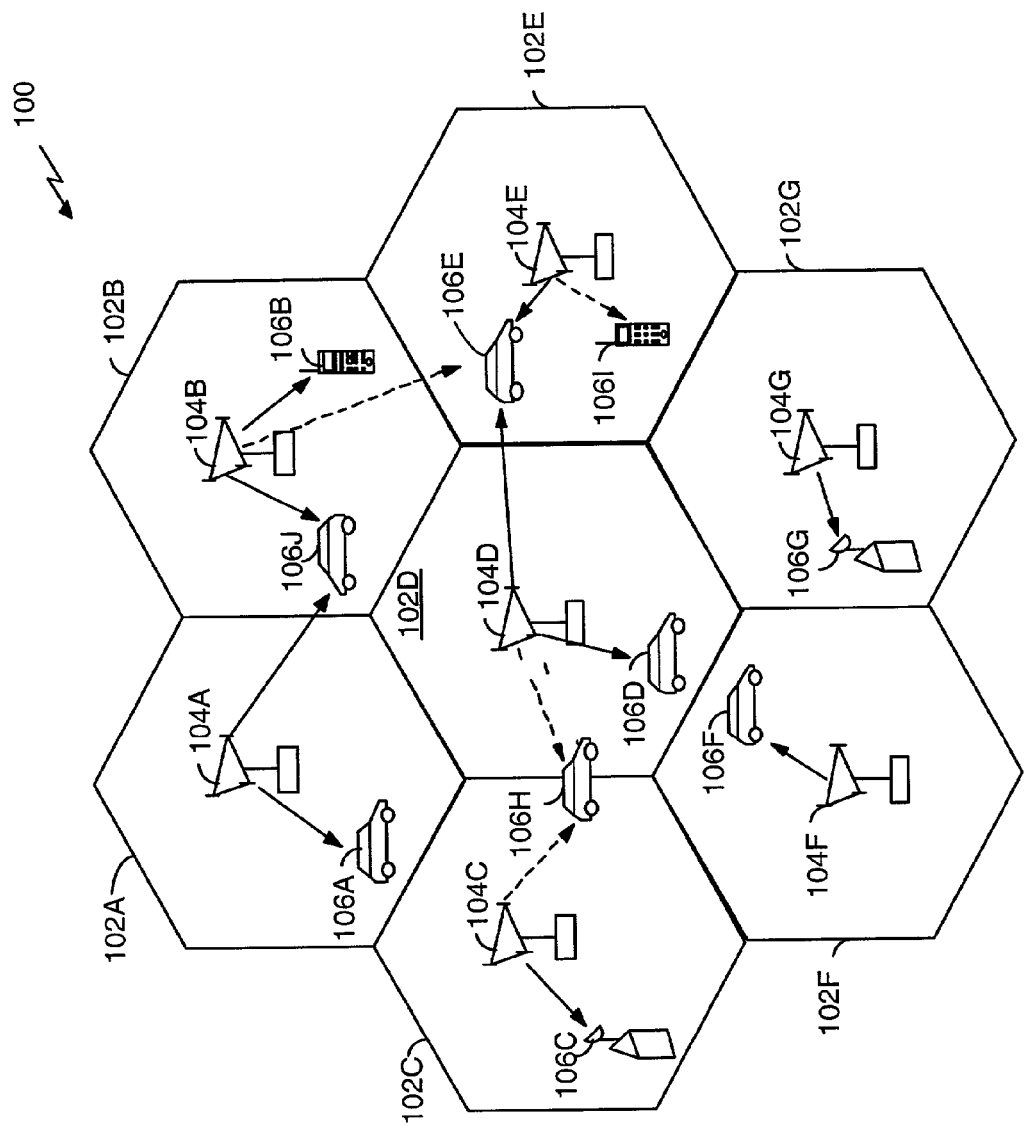
FIG. 1 is a diagram of a spread spectrum communication system that supports a number of users.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

An exemplary embodiment of a wireless communication system employs a method of header compression that reduces the size of each header while satisfying the accuracy and transmission requirements of the system. The exemplary embodiment supports a uni-directional broadcast service. The broadcast service provides IP packets to multiple users. Typically the IP packets comprise video and/or audio streams. Subscribers to the broadcast service "tune in" to a designated channel to access the broadcast transmission. As the bandwidth requirement for high speed transmission of video broadcasts is great, it is desirable to reduce the size of any overhead associated with such broadcast transmission.

Sometimes broadcast service may be used as a service that sends information to a group of users based on their geographic location. This could also be considered "un-addressed" messaging. Examples would be to broadcast local information such as traffic or weather alerts based on a cell/sector or specific paging zone. All users in that area that are capable of receiving broadcast information would receive it.

Broadcast services may also be used for multicasting. Multicast may refer to the ability to broadcast information to a specific set of users based on their subscription to a user group. The user group may be maintained by an administrator. In addition, the user group may be publicly subscribable (e.g., sign-up for advertisement, stock quotes, etc.), or it may be closed to public subscription (e.g., corporate list). The multicast list may also be configured to have the mobile device acknowledge receipt of the message as defined by the user group administrator. This could be considered addressable messaging.

Multicast user groups are generally considered to be closed groups. In these groups a member typically subscribes to the service (public multicast group) by sending a request to the administrator, by some web interface, or other mechanism. A private multicast group is restricted to membership explicitly by the administrator manually adding members.

Broadcast services can also be divided into public and private groups. A public broadcast group is used for sending geographic specific information. All devices in the specific geographic area that have broadcast capability are in the public group and will receive this information. Examples of broadcast information for this public broadcast type are emergency weather alerts, traffic conditions, etc. Private broadcast groups are targeted to sending specific information to a specific group of devices in a particular area. One example of this type of service would be location-based advertising. One possible scenario for this example is where a user may elect to receive specific advertisements when he or she is at a mall, but not at other times.

The following discussion develops the exemplary embodiment by first presenting a spread-spectrum wireless communication system generally. Next, the broadcast service is introduced, wherein the service is referred to as High Speed Broadcast Service (HSBS). Interfaces between the base station and the packet data serving node are introduced for user traffic and signaling. The messages for establishing an A10 connection for user traffic are discussed. Flow treatment and mapping data for conveying treatment and mapping information to the packet data serving node is illustrated and explained. Examples of sending the flow treatment and mapping data from the base station to the packet data serving node are shown. The details of mapping a flow to the correct interface and presenting the use of a service option parameter to define the specifics of a compression algorithm are shown. Finally, several benefits of using the flow treatment and mapping data to convey treatment and mapping information are set forth.

Note that the exemplary embodiment is provided as an exemplar throughout this discussion; however, alternate embodiments may incorporate various aspects without departing from the scope of the present invention. Specifically, the present invention is applicable to a data processing system, a wireless communication system, a unidirectional broadcast system, and any other system desiring efficient transmission of information.

Wireless Communication System

The exemplary embodiment employs a spread-spectrum wireless communication system, supporting a broadcast service. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the cdma2000 standard of protocols. Alternate embodiments may incorporate another standard. Still other embodiments may apply the compression methods disclosed herein to other types of data processing systems.

FIG. 1 serves as an example of a communications system 100 that supports a number of users and is capable of implementing at least some aspects of the embodiments discussed herein. Any of a variety of algorithms and methods may be used to schedule transmissions in system 100. System 100 provides communication for a number of cells 102A-102G, each of which is serviced by a corresponding base station 104A-104G, respectively. In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System", which is assigned to the assignee of the present invention.

The downlink refers to transmission from the base station 104 to the terminal 106, and the uplink refers to transmission from the terminal 106 to the base station 104. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

High Speed Broadcast System (HSBS)

Figure 2:
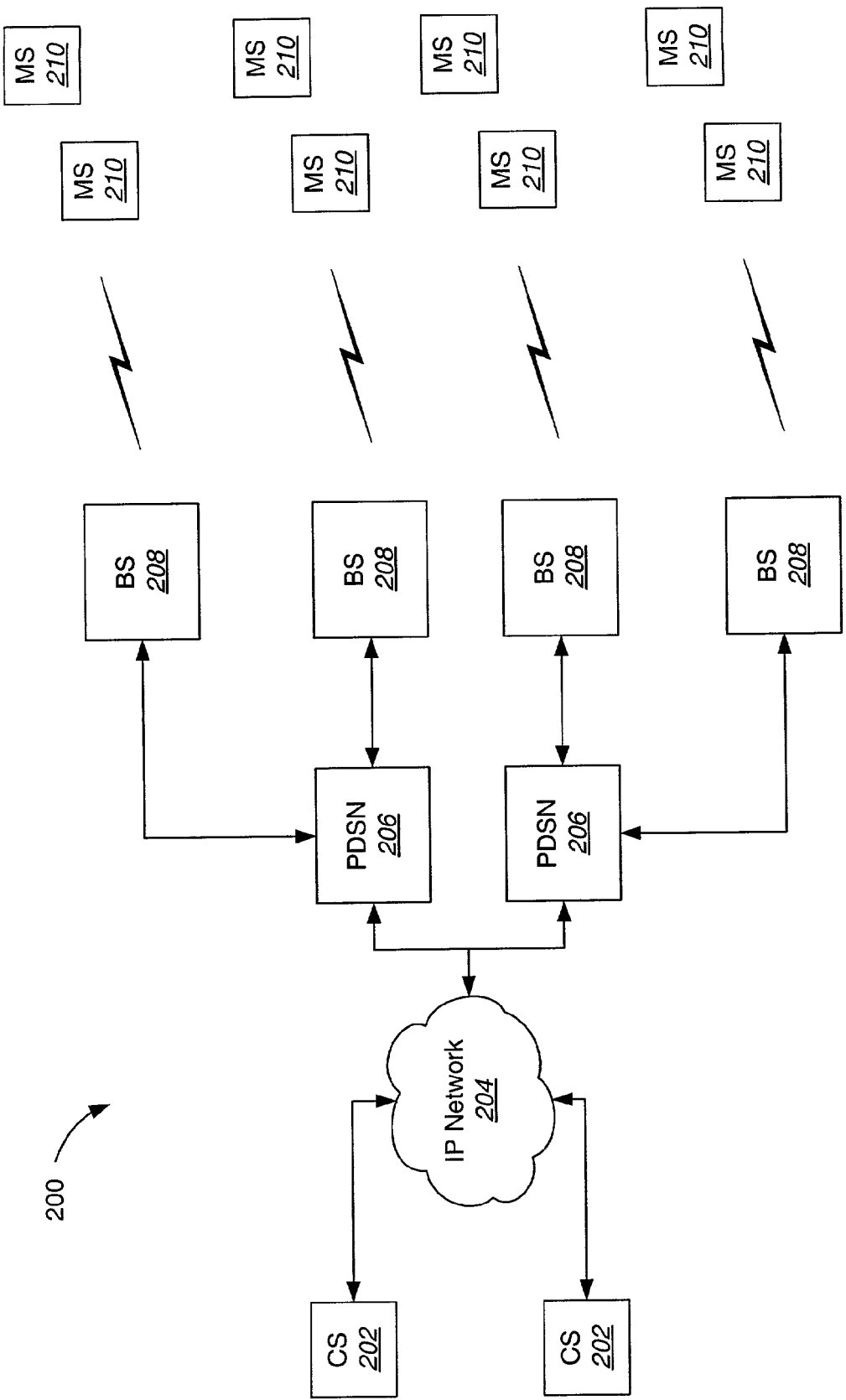
FIG. 2 is a block diagram of the communication system supporting broadcast transmissions.

A wireless communication system 200 is illustrated in FIG. 2, wherein IP packets are provided by one or more Content Servers (CSs) 202 via an IP network 204 to one or more Packet Data Serving Nodes (PDSNs) 206. A CS 202 provides data that is transmitted as Internet Protocol data packets ("IP packets") across the IP network 204. Many different kinds of data may be transmitted by the CS 202. For example, audio data, video data, textual data, electronic files, etc., may be transmitted by the CS 202 through the IP network 204. Video and audio information may be from televised programming or a radio transmission. Thus, the CS 202 may be a server configured to serve video data, audio data, etc. In one embodiment, the CS 202 may be a web server connected to the Internet and functioning to serve data to users browsing the World Wide Web. The IP network 204 may be the Internet, an intranet, a private IP network, etc.

The PDSN 206 receives and processes the IP packets to transmit them to one or more Base Stations 208 (BSs). As shown, each PDSN 206 is in electronic communication with one or more BSs 208. Once a BS 208 receives the data, it then sends the data to one or more Mobile Stations 210 (MS). An MS 210 corresponds to a terminal 106 of FIG. 1. Each BS 208 may serve one or more MSs 210. Typically the BS 208 serves many MSs 210.

Figure 3:
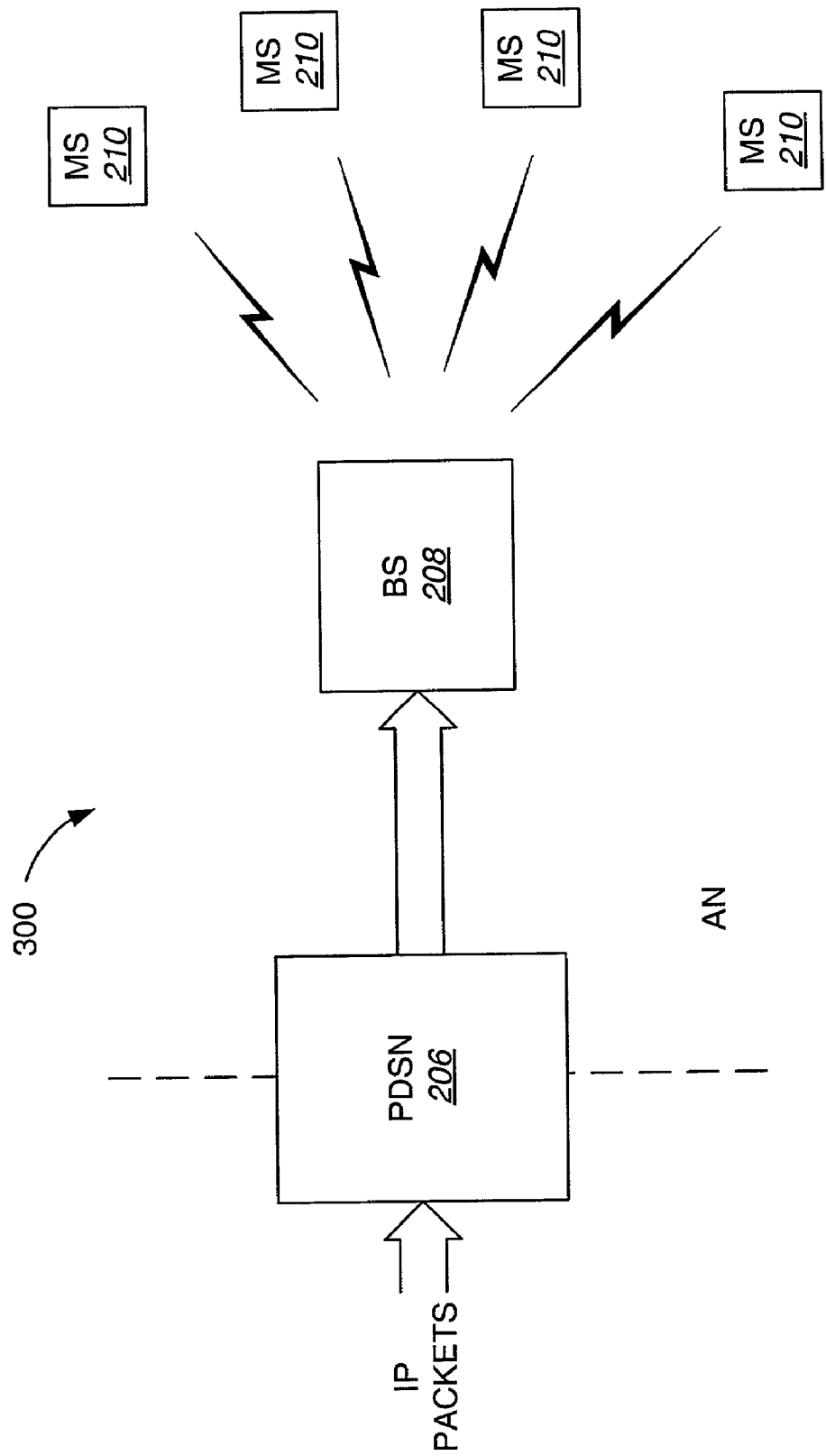
FIG. 3 is a block diagram of the communication system supporting broadcast transmissions.

Referring now to FIG. 3, as mentioned, the information from a CS 202 is provided as packetized data, such as in IP packets. The PDSN 206 processes the IP packets for distribution within an Access Network (AN) 300. As illustrated, the AN 300 is defined as the portions of the system 200 including a BS 208 in communication with multiple Mobile Stations (MSs) 210. The PDSN 206 is coupled to the BS 208. For HSBS service, the BS 208 receives the stream of information from the PDSN 206 and provides the information on a designated channel to subscribers within the system 200.

The HSBS is a stream of information provided over an air interface in a wireless communication system. The "HSBS channel" refers to a single logical HSBS broadcast session as defined by broadcast content. Note that the content of a given HSBS channel may change with time, e.g., 7 am News, 8 am Weather, 9 am Movies, etc. The time based scheduling is analogous to a single TV channel. The "Broadcast channel" refers to a single forward link physical channel, i.e., a given Walsh Code that carries broadcast traffic. The Broadcast Channel, BCH, corresponds to a single CDM channel.

A single broadcast channel can carry one or more HSBS channels; in this case, the HSBS channels will be multiplexed in a Time-Division Multiplex (TDM) fashion within the single broadcast channel. In one embodiment, a single HSBS channel is provided on more than one broadcast channel within a sector. In another embodiment, a single HSBS channel is provided on different frequencies to serve subscribers in those frequencies.

According to the exemplary embodiment, the system 100 illustrated in FIG. 1 supports a high-speed multimedia broadcasting service referred to as High-Speed Broadcast Service (HSBS). The broadcast capabilities of the service are intended to provide programming at a data rate sufficient to support video and audio communications. As an example, applications of the HSBS may include video streaming of movies, sports events, etc. The HSBS service is a packet data service based on the Internet Protocol (IP).

According to the exemplary embodiment, a service provider is referred to as the CS 202, wherein the CS 202 advertises the availability of such high-speed broadcast service to the system users. Any user desiring to receive the HSBS service may subscribe with the CS 202. The subscriber is then able to scan the broadcast service schedule in a variety of ways that may be provided by the CS 202. For example, the broadcast content may be communicated through advertisements, Short Management System (SMS) messages, Wireless Application Protocol (WAP), and/or some other means generally consistent with and convenient for mobile wireless communications. Base Stations 208 (BSs) transmit HSBS related parameters in overhead messages, such as those transmitted on channels and/or frequencies designated for control and information, i.e., non-payload messages. Payload refers to the information content of the transmission, wherein for a broadcast session the payload is the broadcast content, i.e., the video program, etc. When a broadcast service subscriber desires to receive a broadcast session, i.e., a particular broadcast scheduled program, the MS 210 reads the overhead messages and learns the appropriate configurations. The MS 210 then tunes to the frequency containing the HSBS channel, and receives the broadcast service content.

In order for the MSs 210 to discover and listen to broadcast channels successfully, various broadcast service related parameters are transmitted over the air interface. The broadcast service is designed to support different protocol options in the protocol stack. This requires the receivers of the broadcast service be informed of the protocol options selected to facilitate proper decoding and processing of the broadcast. In one embodiment, the CS 202 provides this information to the receiver as an overhead system parameter message, consistent with cdma2000 standard. The advantage to the receiver is the ability to receive the information immediately from the overhead message. In this way, the receiver may immediately determine whether the receiver has sufficient resources to receive the broadcast session. The receiver monitors the overhead system parameter messages. The system may implement a service option number corresponding to a set of parameters and protocols, wherein the service option number is provided in the overhead message. Alternately, the system may provide a set of bits or flags to indicate the different protocol options selected. The receiver then determines the protocol options for decoding the broadcast session correctly.

Figure 4:
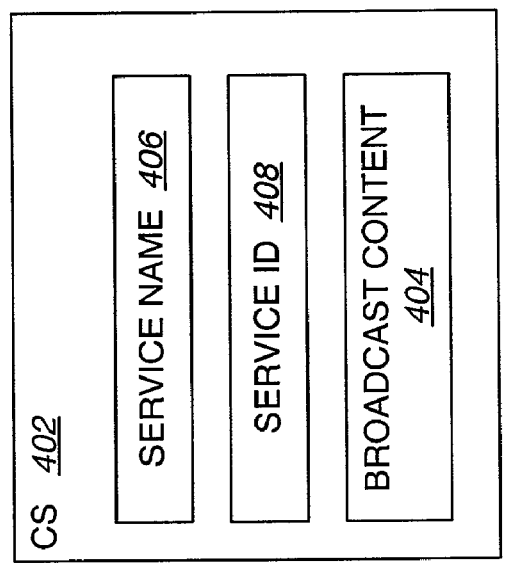
FIG. 4 is a block diagram of a content server providing a single broadcast service.

Referring to FIG. 4, a broadcast/multicast service provided by a CS 402 includes transmitting broadcast content 404. The broadcast content 404 may be a fixed set of data or may be a continuous stream of data. The broadcast/multicast service typically has a broadcast/multicast service name 406 used to identify the broadcast service. In the embodiment illustrated in FIG. 4, the service name 406 is a text-based name that users can read and interpret. For example, possible service names 406 include CNN News, NBC Sports, etc.

The service name 406 is associated with a service identification (service ID) 408. The service ID 408 is typically a number and is used to identify the particular broadcast multicast service. The service ID 408 is an identifier for the broadcast/multicast service and in particular embodiments herein may be referred to as the BCMCS_ID. Accordingly, the term service ID 408 is a broad term that encompasses the BCMCS_ID as described herein.

Figure 5:
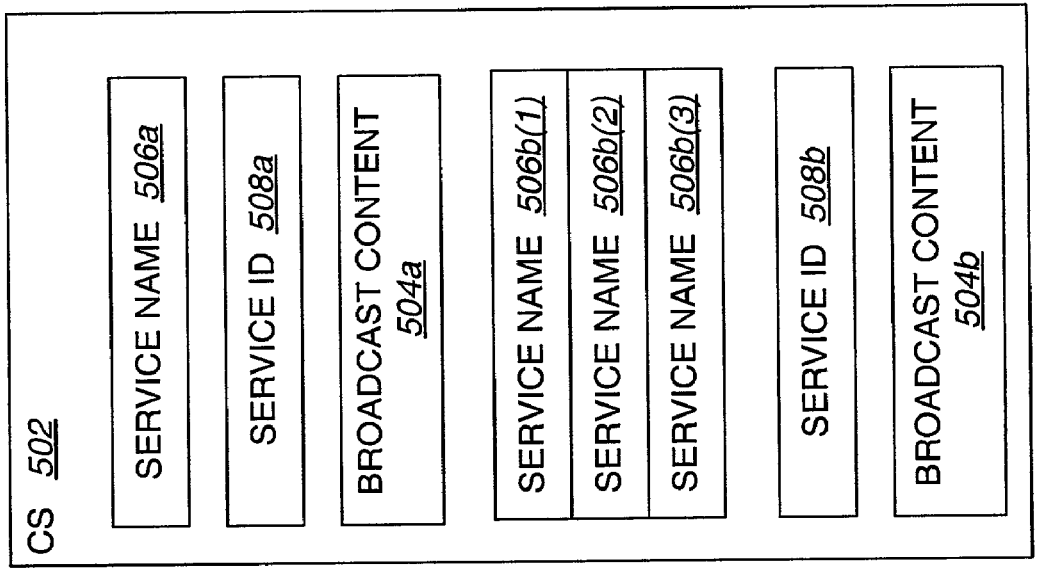
FIG. 5 is a block diagram of a content server providing multiple broadcast services.

The CS 402 of FIG. 4 provides a single broadcast/multicast service. FIG. 5 illustrates a CS 502 that provides more than one broadcast/multicast service. The CS 502 of FIG. 5 provides two broadcast/multicast streams of broadcast content 504*a*, 504*b* where each broadcast has an associated service name 506*a*, 506*b* and service ID 508*a*, 508*b*. As shown in FIG. 5, the service may have more than one service name 506*b*. Synonymous service names 506*b*(1), 506*b*(2), 506*b*(3) may all be used to identify the same broadcast content 504*b*.

Figure 6:
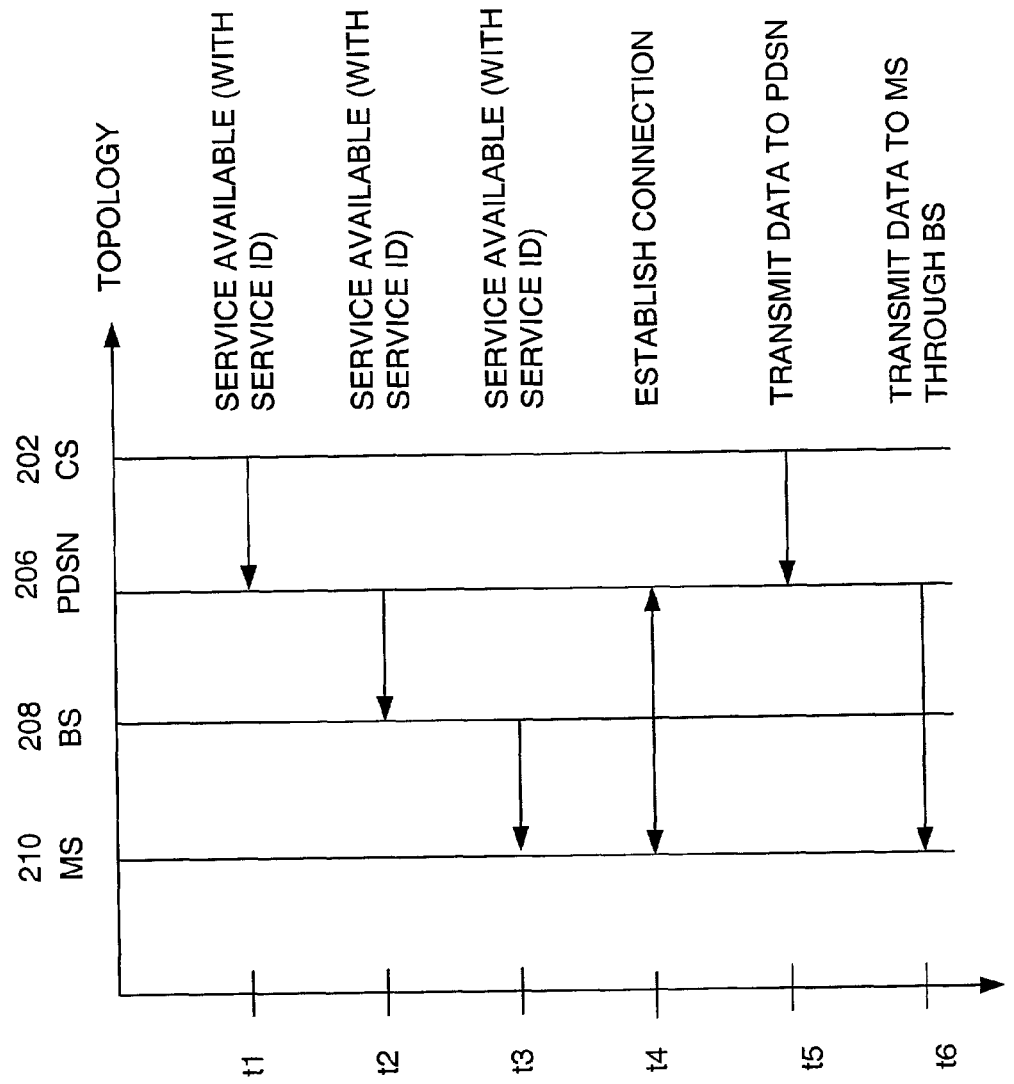
FIG. 6 is a flow diagram for accessing a broadcast service in a wireless communication system topology.

The CS 202 advertises the availability of the broadcast/ multicast service by sending the service ID 408 to one or more PDSNs 206, as shown in FIG. 6. FIG. 6 illustrates a broadcast flow according to one embodiment. The horizontal axis represents the topology of the system, i.e., infrastructure elements. The vertical axis represents the time line. At time t1 the CS 202 sends the service ID 408 (or BCMCS_ID) to the PDSN 206. The PDSN 206 sends the service ID 408 to the BS 208 at time t2, which in turn transmits the service ID 408 to one or more MSs 210 at time t3. An MS 210 that desires to receive the service may establish a connection with the PDSN 206 at time t4 through the BS 208 and may then begin receiving the broadcast/multicast service from the CS 202 through the PDSN 206 and the BS 208 at times t5 and t6.

The service ID 408 allows the MS 210 to identify the broadcast service. In addition, it enables the BS 208 to advertise the availability of the broadcast service to one or more MSs 210. Use of the service ID 408 may also be useful when an MS 210 moves from one BS 208 to another BS 208. Each BS 208 may transmit information that includes the service IDs 408 available in neighboring BSs 208 so that an MS 210 may determine if it can continue receiving the service and/or the type of handoff that is to occur. The following embodiments describe various methods and apparatus for providing broadcast service information (including service ID 408 and related information) to an MS 210 through a wireless network. As will be discussed, the following embodiments enable an MS 210 to continue receiving a broadcast service as it crosses sector boundaries through use of the service ID 408. In the specifications that follow, the more particular BCMCS_ID may be referred to in place of the service ID 408 and is to be understood as being a more specific embodiment of a service ID 408.

Figure 15:
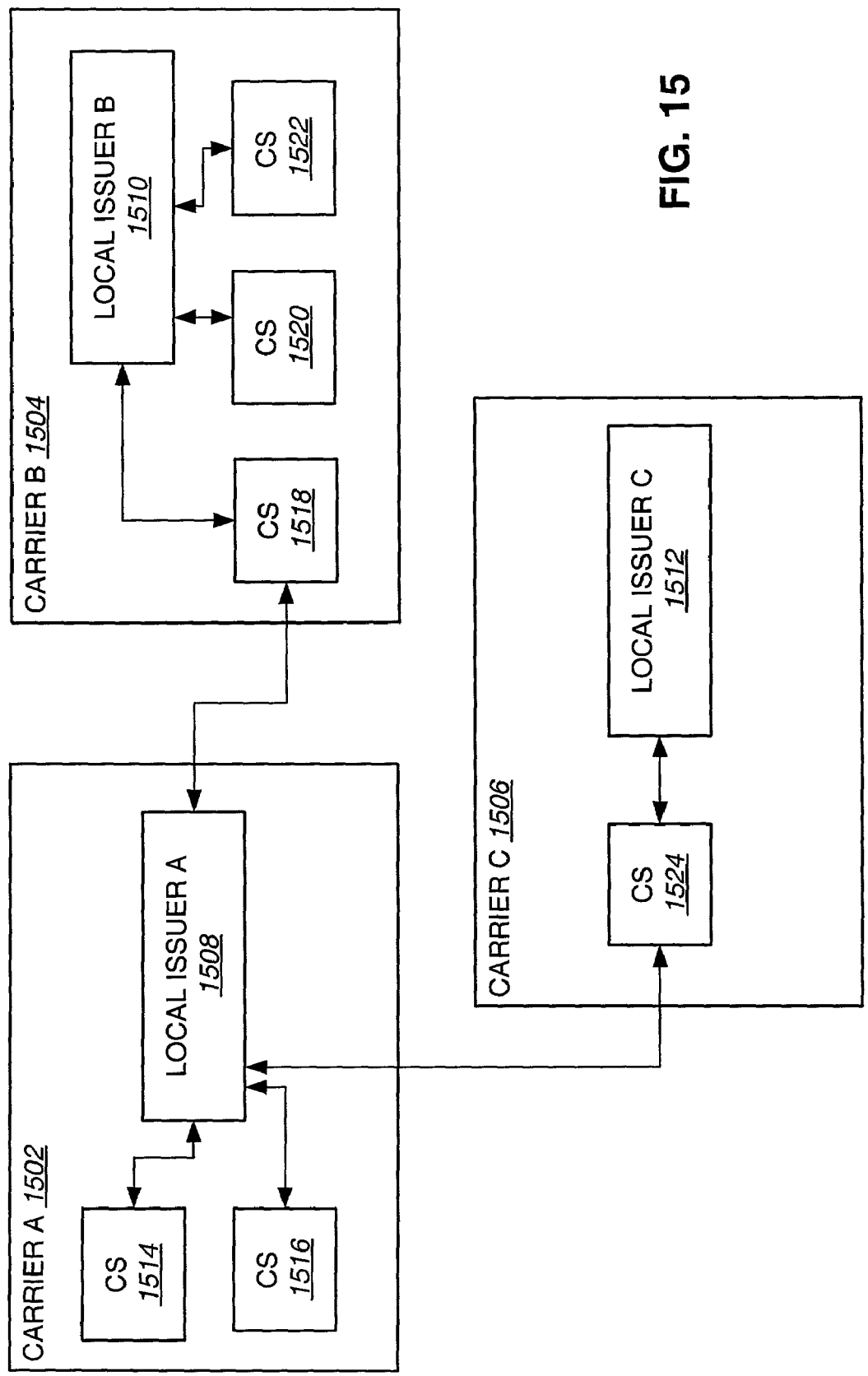
FIG. 15 is a network block diagram illustrating multiple local issuers issuing service IDs to content servers.

The provision of service IDs 408 may be implemented through various embodiments. For example, the service IDs 408 may be globally unique and be provided by a global issuer. Alternatively, the service IDs 408 may be locally unique and may be handled by multiple local issuers. Of course, a combination of global and local issuers may be used wherein service IDs 408 may either be globally unique or locally unique. The embodiment discussed in relation to FIG. 7 will discuss the globally unique service IDs 408. FIG. 15 will discuss service IDs 408 that is locally unique. Finally, FIG. 16 details an embodiment where service IDs 408 may either be locally or globally unique.

Referring now to FIG. 7, the service ID 408 may be a globally unique value that identifies a multicast/broadcast service. An administration, referred to as a global issuer 702, is used to manage the allocation of globally unique service ID 408 values. Three carriers, carriers A 704, B 706 and C 708, are illustrated in FIG. 7. It will be appreciated by those skilled in the art that different carriers may overlap one another, although that possibility is not illustrated in FIG. 7. The carriers each include a CS 710, 712, 714.

When a CS with a certain carrier desires to provide broadcast/multicast services, the CS requests a service ID 408 from a global issuer 702. For example, the CS 710 of carrier A 704 would request a service ID 408 from the global issuer 702 so that the CS 710 could then associate the service ID 408 with the service name 406. The global issuer 702 stores service IDs 408 and administers the generation and issuance of service IDs 408. The global issuer 702 may include a service ID database 716.

FIG. 8 illustrates an embodiment of a record 802 that may be used and stored in the service ID database 716. The BCMCS_ID 804 is the service ID 408 generated by the issuer 702. The service name 806 is the name of the service provided by the CS 710. As discussed above, more than one service name 806 may be associated with the BCMCS_ID 802. For example, the broadcast/multicast service may have multiple service names 806 that are synonymous. One such example is that a local CBS broadcast service in San Diego, Calif. can be identified by names like CBS, Channel 8, or KFMB. Therefore, synonymous service names 806 may be mapped to the same BCMCS_ID 804.

A lifetime field 808 may also be included in the record 802 to indicate the life of the BCMCS_ID 804. The mapping between a broadcast/multicast service name 806 and a BCMCS_ID 804 may be static or dynamic. Static ID assignment may be used initially when there are not too many broadcast/multicast services. Dynamic BCMCS_ID assignment may be used if the number of broadcast/multicast services is larger than the BCMCS_ID space. If dynamic ID assignment is used, the binding between a broadcast/multicast service name 806 and a BCMCS_ID 804 should have a lifetime. Of course, if the lifetime of the BCMCS_ID 804 is not needed, the record 802 shown in FIG. 8 may not include the lifetime field 808. In addition, static addressing may be used for always-on broadcast/multicast (e.g. 24-hour weather service) and periodic broadcast/multicast (e.g. 1-hour of daily news). Dynamic addressing may be used for periodic broadcast/multicast and one-time broadcast/multicast (e.g. sporting event of Chargers vs. Raiders).

FIG. 9 illustrates an embodiment of a CS record 902 that may be used and stored at the CS 710. The record 902 includes the BCMCS_ID 904 and the service name 906. The record 902 also includes the lifetime 912. The BCMCS_ID 904 is associated with an IP multicast address 908 and UDP port number 910. An MS 210 may obtain the BCMCS_ID 904, IP multicast address 908, and UDP port number 910 of a broadcast/multicast service via an out-of-band mechanism. The MS 210 obtains the mapping between the BCMCS_ID 904 and the physical channel parameters via IS-2000 Layer-3 signaling.

Advantages of using a BCMCS_JD 904 is to avoid using IP addresses and port numbers or avoid using text-based service names in the IS-2000 Layer-3 signaling to associate a broadcast/multicast service and physical channel parameters. Using addresses and port numbers or using text based service names can be viewed as a layering violation. It may also decrease signaling overhead because up to 10 bytes may be required to identify a service by its source/destination addresses and port numbers, and a large number of bytes may be required to identify a service by its text-based service name.

FIG. 10 illustrates a flow diagram of a CS 710 obtaining a BCMCS_ID 804 from a global issuer 702. The CS 710 identifies 1002 the global issuer 702 and then requests 1004 a BCMCS_ID 804. Typically the CS 710 sends the service name(s) 806 to the global issuer 702 in the request for a BCMCS_ID 804. The global issuer 702 receives the request and generates 1006 or otherwise provides a BCMCS_ID 804. The global issuer 702 sends 1008 the BCMCS_ID 804 to the CS 710 and stores 1010 the new record in the database 716. In one embodiment, the global issuer 702 may send the record 802 illustrated in FIG. 8 to the CS 710.

FIG. 11 is a flow diagram of a method for advertising the availability of certain broadcast/multicast services. The CS 202 sends 1102 the BCMCS_ID 804 to PDSNs 206 via the IP Network 204. The PDSNs 206 receive this information and send 1104 it on to one or more BSs 208. A BS 208 receives 1106 the BCMCS_ID 804 and configures a Broadcast Service Parameters Message (BSPM) to transmit to MSs 210 within the cell/sector. The BS 208 then sends 1108 the BSPM out over an overhead channel. The MS 210 receives 1110 the BSPM and determines the broadcast/multicast services that are available and the details for tuning it to and receiving the services.

Figure 12:
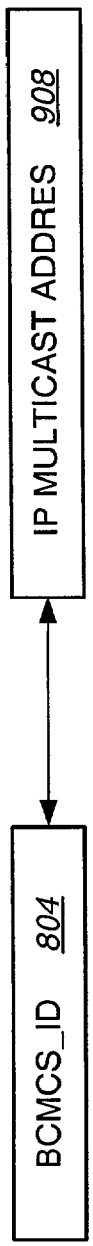
FIG. 12 illustrates one-to-one mapping between a BCMCS_ID and an IP multicast address.

A BCMCS_ID 804 has one or more IP multicast addresses 908 associated with it. The mapping between BCMCS_ID 804 and IP multicast address 908 may be one-to-one, many-to-one, or one-to-many. As shown in FIG. 12, a BCMCS_ID 804 may be associated with one IP multicast address 908 to form a one-to-one relationship.

Figure 13:
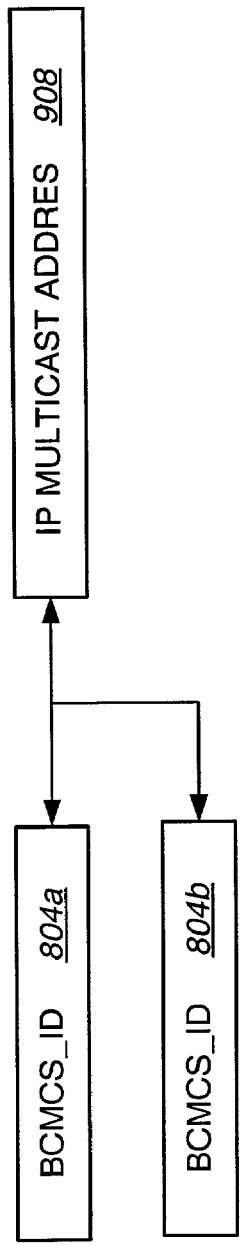
FIG. 13 illustrates many-to-one mapping between BCMCS_IDs and an IP multicast address.

As shown in FIG. 13, multiple BCMCS_IDs 804a, 804b may be mapped to a single IP multicast address 908. For example, a CS 202 may send multiple services via the same IP multicast address 908 and the different services may be distinguished via UDP port numbers.

Figure 14:
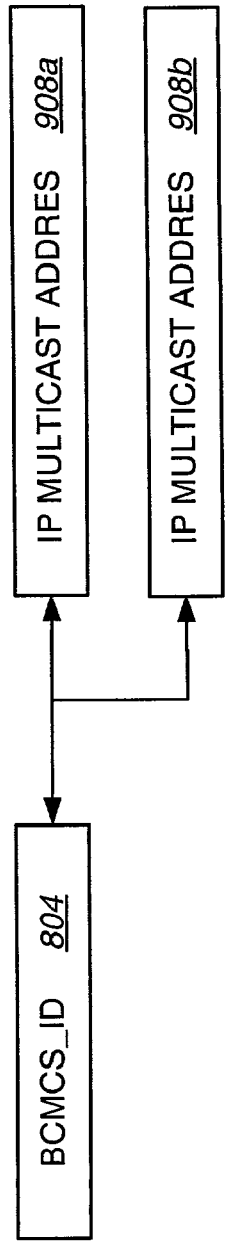
FIG. 14 illustrates one-to-many mapping between a BCMCS_ID and IP multicast addresses.

Referring now to FIG. 14, a single BCMCS_ID 804 may be mapped to multiple IP multicast addresses 908a, 908b. For example, a CS 202 may want to provide a global multicast/broadcast service spanned across multiple carriers and geographic regions. The CS 202 may use regional servers (one per geographic region which may be shared by multiple carriers) to distribute the content more efficiently, in order to avoid the delay if a single server (with single IP multicast address 908) would be used for all regions and carriers in the world. It is possible that in different regions, different IP multicast addresses 908 may be assigned to the same BCMCS_ID 804. In the embodiment where a BCMCS_ID 804 maps to multiple IP multicast addresses 908a, 908b, within a same region the BCMCS_ID 804 is only associated with a single IP multicast address 908. One disadvantage of this one-to-many mapping from BCMCS_ID 804 to IP multicast addresses 908 is that when a MS 210 moves to a new region, the MS 210 needs to find out, manually or automatically, the new IP multicast address 908 and other parameters (e.g. security association) of the service via some out-of-band mechanisms. This disadvantage may lead to long service interruption if the MS 210 is being hard-handoff from one region to another.

The foregoing discusses how the BCMCS_ID 804 may be a globally unique value. The BCMCS_ID 804 may also be a locally unique value that identifies a multicast/broadcast service. In the embodiment where the BCMCS_ID 804 is not globally unique, each carrier has the freedom to manage the allocation of the BCMCS_ID 804 values. In contradistinction, the globally unique value requires coordination and administration to guarantee the uniqueness of BCMCS_IDs 804 among carriers.

FIG. 15 illustrates three carriers: carrier A 1502, carrier B 1504 and carrier C 1506. Each carrier 1502, 1504, 1506 has a local issuer 1508, 1510, 1512, respectively, that manages and administers to the issuance of BCMCS_IDs 804 for that carrier. To obtain a BCMCS_ID 804 for a particular carrier, a CS requests a BCMCS_ID 804 from that carrier and/or from the carrier's local issuer. For example, for a CS 1518 of carrier B 1504 to obtain a BCMCS_ID 804 for carrier B 1504, the CS 1518 would request a BCMCS_ID 804 from local issuer B 1510. By way of further example, for the CS 1518 of carrier B 1504 to obtain a BCMCS_ID 804 for carrier A 1502, the CS 1518 would request a BCMCS_ID 804 from local issuer A 1508. Other examples of requests being made by CSs are shown in FIG. 15.

A broadcast/multicast service may be provided locally by a carrier, or the service may be available to multiple carriers with a roaming agreement. As discussed above, the mapping between broadcast/multicast service name and BCMCS_ID may be one-to-one, many-to-one, or one-to-many.

A broadcast/multicast service that is available to multiple carriers through a roaming agreement may be mapped to multiple BCMCS_IDs 804. Since each carrier manages its BCMCS_ID 804 space, it is possible that different carriers may pick different BCMCS_ID 804 values for the same roaming broadcast/multicast service.

The mapping between a broadcast/multicast service name and a BCMCS_ID 804 may be static or dynamic, as discussed above.

The mapping between BCMCS_ID 804 and IP multicast address 908 may be one-to-one, many-to-one, or one-to-many. As discussed in relation to FIG. 12, the BCMCS_ID 804 and IP multicast address 908 may have a one-to-one relationship. Multiple BCMCS_IDs 804a, 804b may be mapped to a single IP multicast address 908 as shown in FIG. 13. Finally, and referring again to FIG. 14, a single BCMCS_ID 804 may be mapped to multiple IP multicast addresses 908a, 908b.

Figure 16:
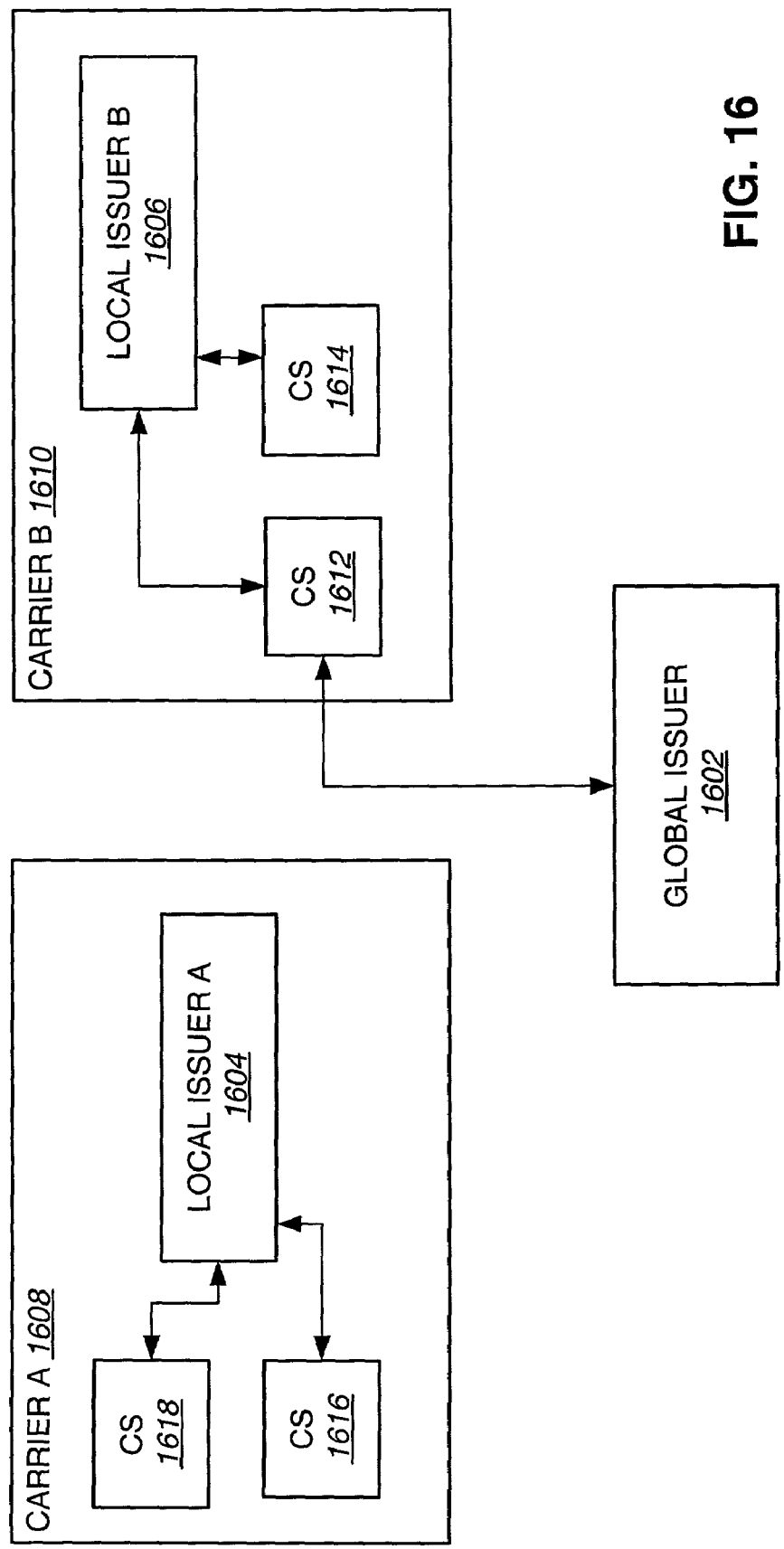
FIG. 16 is a network block diagram illustrating a global issuer and multiple local issuers issuing service IDs to content servers.

The foregoing discusses how the BCMCS_ID 804 may be a globally unique value and how the BCMCS_ID 804 may be a locally unique value. The following embodiment illustrates the provision of BCMCS_IDs 804 that may either be globally or locally unique. FIG. 16 illustrates the combination of a global issuer 1602 and multiple local issuers 1604, 1606 for local carriers 1608, 1610. A CS 1616 desiring a local BCMCS_ID 804 from carrier A 1608 may request a BCMCS_ID 804 from the local issuer 1604 of carrier A 1608. A CS 1612 desiring a globally unique BCMCS_ID 804 may request a global BCMCS_ID 804 from the global issuer 1602.

FIG. 17 illustrates an embodiment of a dual BCMCS_ID 1702: a BCMCS_ID 1702 that may be either globally unique or locally unique. The dual BCMCS_ID 1702 includes a global indicator 1704 and a service portion 1706. The global indicator 1704 indicates the uniqueness of the BCMCS_ID 1702. In the embodiments of FIGS. 17-19, one bit may be used as the global indicator 1704. A global indicator 1704 value of zero may be used to indicate that the BCMCS_ID 1702 is only unique within a carrier of a geographic region. If the global indicator 1704 is set to one, the service is globally unique. The service portion 1706 of the dual BCMCS_ID 1702 may include the BCMCS_ID itself. Those skilled in the art will appreciate the various formats and data lengths that may be used to implement the dual BCMCS_ID 1702.

FIG. 18 illustrates a dual BCMCS_ID 1802 with a global indicator 1804 of zero indicating that the dual BCMCS_ID 1802 is locally unique. The dual BCMCS_ID 1802 may include a system ID 1806 and the BCMCS_ID 1808. The system ID 1806 identifies a carrier in a geographic area. The definition and administration of the system ID 1806 is documented in the TIA/EIA TELECOMMUNICATIONS SYSTEMS BULLETIN, International Implementation of Wireless Telecommunication Systems Compliant With ANSI/TIA/EIA-41, TSB-29 and its addendums, which are all incorporated herein by reference. This field is used if the global indicator 1804 is zero. The dual BCMCS_ID 1802 includes the BCMCS_ID 1808 that identifies the multicast/broadcast service. If the global indicator 1804 is zero, the carrier as identified by the system ID 1806 may be responsible for managing the BCMCS_ID 1808 allocation.

FIG. 19 illustrates a dual BCMCS_ID 1902 with a global indicator 1904 of one indicating that the dual BCMCS_ID 1902 is globally unique. The dual BCMCS_ID 1902 includes the BCMCS_ID 1906. If the global indicator 1904 is one, the BCMCS_ID 1906 value can be managed by the same organization that administers the system ID 1806.

As discussed above, the mapping between broadcast/multicast service name 406 and BCMCS_ID 804 may be one-to-one, many-to-one, or one-to-many. One helpful example of a broadcast/multicast service having multiple BCMCS_IDs 804 is as follows. Assume carrier A has a broadcast/multicast service available initially for its subscribers who are not roaming. This service therefore is associated with a BCMCS_ID 804 uniquely local within carrier A. Later, assume carrier A decides to have a roaming agreement with carrier B to allow roaming subscribers to receive the same broadcast/multicast service. Because the original BCMCS_ID 804 of the service is not globally-unique, a new BCMCS_ID 804 is needed to associate with the same service in Carrier B.

Carrier A has several options in obtaining a new BCMCS_ID 804 to associate with the same service in carrier B. One option is to obtain a globally-unique BCMCS_ID 804 for the service, and eliminate the original locally-unique BCMC- S_ID 804. Using this option would require all the non-roaming subscribers to find out the new association between the service name 406 and the new globally-unique BCMCS_ID 804.

Another option is to request that carrier B assign a locally-unique BCMCS_ID 804 to the service while keeping the original BCMCS_ID 804 locally-unique to carrier A. This is an example of one service mapping to multiple BCMCS_IDs 804. When the MS 210 is not roaming, it uses the BCMCS_ID 804 locally-unique to carrier A. When the MS 210 roams to carrier B, it uses the BCMCS_ID 804 locally-unique to Carrier B. One disadvantage of using this option is that if carrier B has roaming agreements with N carriers, then the service is mapped to N+1 BCMCS_IDs 804.

A further option for carrier A is to obtain a globally-unique BCMCS_ID 804 for the service while keeping the original locally-unique BCMCS_ID 804. This is another example of one service mapping to multiple BCMCS_IDs 804. When the MS 210 is not roaming, it uses the BCMCS_ID 804 locally-unique to carrier A. When the MS 210 is roaming, it uses the globally-unique BCMCS_ID 804 regardless of roaming carrier.

The mapping between BCMCS_ID 804 and IP multicast address 908 may be one-to-one, many-to-one, or one-to-many, as discussed in relation to FIGS. 12-14.

When an MS 210 moves from one cell/sector to another, the MS 210 needs to determine the relationship between the BCMCS_IDs 804 transmitted in sectors in order to properly handle the broadcast service it is currently monitoring. The following sections describe such BCMCS_ID 804 related handoff issues.

For each sector, the broadcast channel protocols and parameters may be transmitted to the MS 210. In one embodiment, a Service Option (SO) number is assigned to each set of broadcast protocols and parameters, wherein the SO number is transmitted to the multiple receivers. In a derivation thereof, the parameter information is transmitted to the multiple receivers directly as a plurality of coded fields. The former method of identifying broadcast protocols and parameters by the SO number, incorporates a BSPM. The BSPM is an overhead message specific to the broadcast service. Those MSs 210 desiring to receive the HSBS service would monitor the BSPM. The BSPM is transmitted periodically by each sector that has configured one or more broadcast channels.

Figure 20:
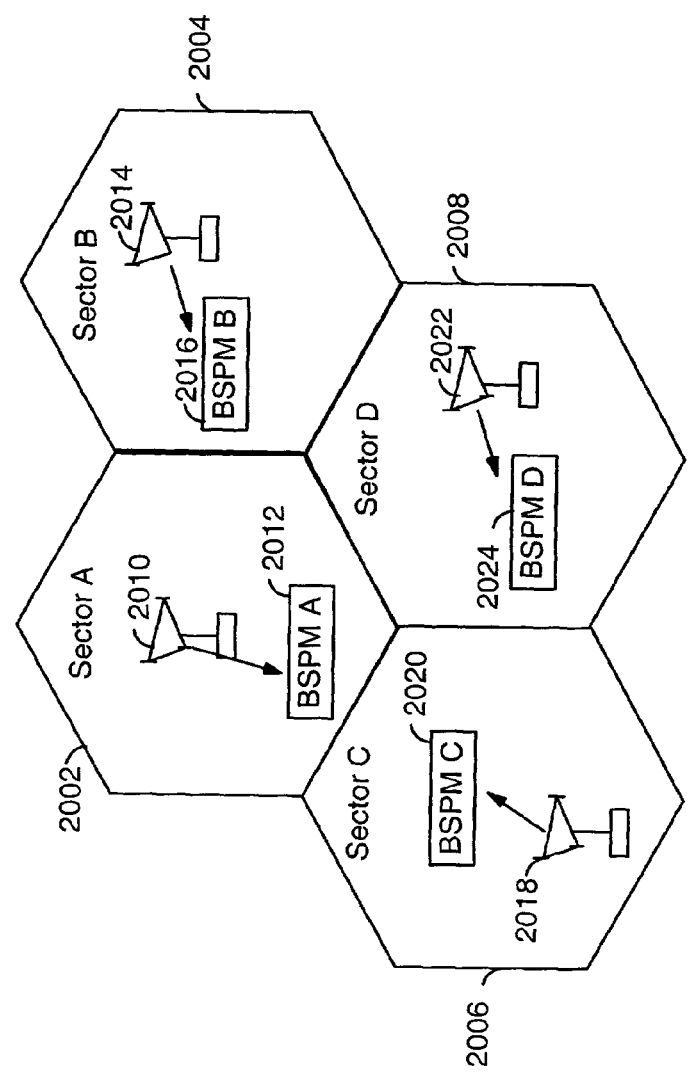
FIG. 20 is a diagram of a spread spectrum communication system wherein each sector is transmitting a BSPM.

FIG. 20 illustrates four adjacent sectors, sector A 2002, sector B 2004, sector C 2006 and sector D 2008. The BS in each sector transmits a BSPM specific to that sector. The BS 2010 in sector A 2002 transmits BSPM A 2012, the BS 2014 in sector B 2004 transmits BSPM B 2016 and the BS 2018 in sector C 2006 transmits BSPM C 2020. Similarly, BSPM D 2024 is transmitted in sector D 2008. The BSPM in each sector is configured to include information about the broadcast services in each adjacent sector. As a result, an MS 210 moving from one sector to another sector may obtain the information in the BSPM to determine what broadcast services are available in the destination sector, what BCMCS_IDs are available, and other related parameters.

Figure 21:
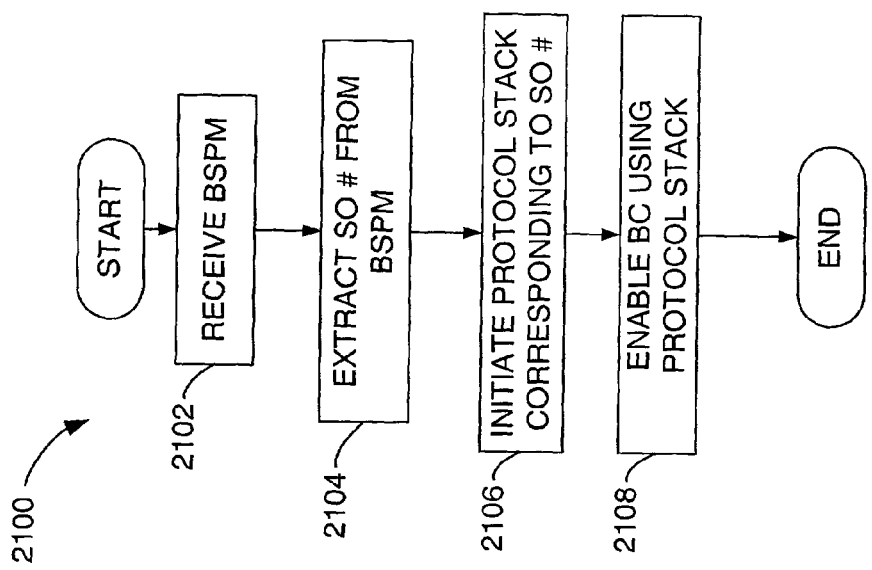
FIG. 21 illustrates a method of providing broadcast service parameter and protocol information using a BSPM.

FIG. 21 illustrates a method 2100 of providing broadcast service parameter and protocol information using a BSPM. At step 2102 the MS 210 receives the BSPM from the CS 202. An embodiment of a BSPM is described below with respect to FIG. 26. The MS 210 extracts the SO number from the BSPM at step 2104. The SO number is mapped to a set of parameters and protocols sufficient for the MS 210 to receive the desired broadcast. The MS 210 then initiates the protocol stack corresponding to the selected SO number at step 2106. Once the protocol stack is initiated, the MS 210 is able to receive and decode information received on the broadcast channel at step 2108. Note that the BSPM is transmitted on a separate Walsh channel known to the subscribers.

Figure 22:
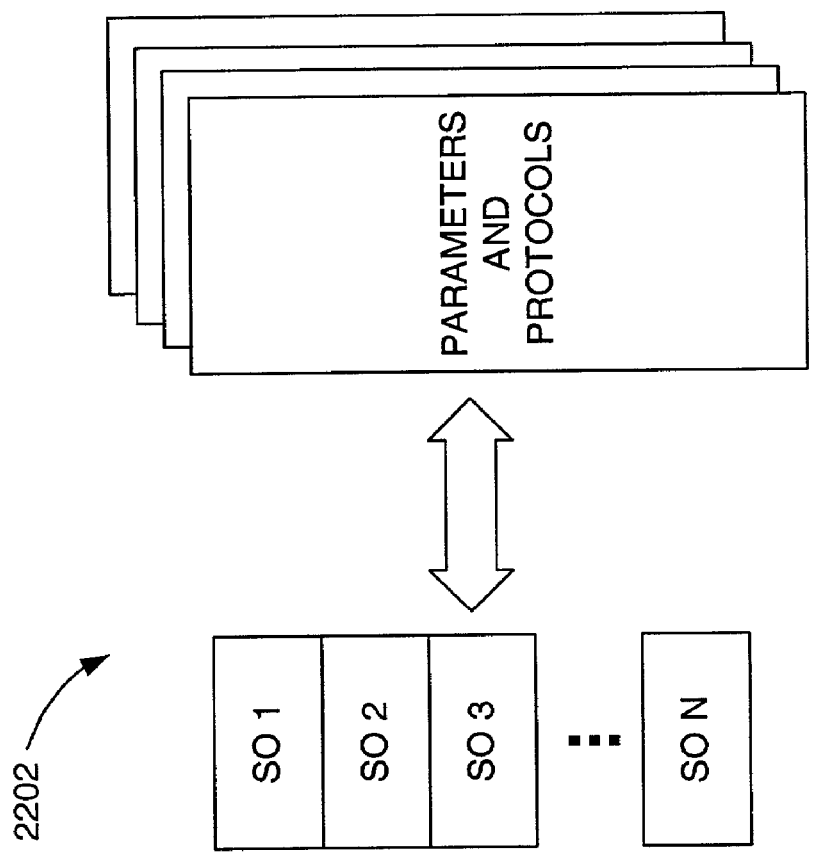
FIG. 22 illustrates a mapping of each of the SO numbers to a set of parameters and protocols.

FIG. 22 illustrates a mapping 2202 of each of the SO numbers to a set of parameters and protocols. When the CS 202 initially schedules a broadcast, such as soccer match on a given day, the CS 202 determines the parameters and protocols to be used for transmission of the broadcast from a set of previously standardized options.

In one embodiment, the SO number corresponds to a fixed set of protocols and parameters, wherein the mapping is known at the CS 202 and at the MS 210. The a priori knowledge of the mapping avoids the need to transmit the information, and thus reduces the transmission overhead, i.e., conserves bandwidth. The mappings are stored at the MS 210, and therefore are not readily changed or updated. If the CS 202 is to use a combination of parameters that have not been previously standardized as an SO number, the standards organization may define a new profile of parameters before this combination of parameters is used for the broadcast.

FIG. 23 illustrates the various channels used for transmission of various information in a broadcast system. As illustrated the system 2300 includes a CS 2302 and an MS 2304, communicating via a broadcast channel 2310, an overhead channel 2312, and a traffic channel 2314. Broadcast content of a given broadcast session is transmitted on the broadcast channel 2310, which may be a uniquely assigned frequency or may be a uniquely assigned Walsh channel. Transmission of a BSPM message is provided on the overhead channel 2312. The traffic channel 2314 is used for transmission of the out-of-band signaling, such as communication between CS 2302 and MS 2304, and communications between PDSN (not shown) and MS 2304.

The MS is able to contact the CS and PDSN directly using the out-of-band signaling over a packet data service option. The out-of-band communication allows the CS to update the information without transmitting via the BS, as the out-of-band communication is directly between the MS and the PDSN or the MS and the CS. Note that when using the packet data service as the out-of-band means, the communication between the MS and CS still passes through the BS. However, the BS does not require knowledge of the payload, thus making it unnecessary to coordinate the CS and BS protocols.

To avoid the disadvantages of the out-of-band methods of transmitting the protocols and parameters to the receivers, the SDP description from the CS can be multiplexed into the broadcast stream. This allows the MS to determine the protocol options used by the CS without setting up a packet data call.

The SDP description is sent as frequently as a short term encryption key (SK) in the broadcast stream. The rate of sending these updates will be limited by the amount of bandwidth available for such updates. For example, if the SDP description is 300 bytes in size and sent every 3 seconds, the required bandwidth is 800 bps. Note that since the SDP description originates from the CS, the CS can improve the media quality by multiplexing the SDP message into the broadcast stream when the media bandwidth is low enough to accommodate it. Effectively the SDP information may be adaptively based on bandwidth conditions. Therefore, as the channel condition and/or stresses on the bandwidth of the system change, the frequency of SDP transmission may change also. Similarly, it may be possible to change the size of the SDP by adjusting the information contained therein specific to a given system.

The SDP description is typically transported in RTSP, SAP, or SIP messages. To avoid the overhead of such protocols, it is recommended that the SDP description be transported directly over UDP by identifying a well-known UDP port number to carry the SDP message. This port number is not used to carry RTP or other types of UDP traffic sent over the broadcast channel. The UDP checksum provides error detection for the SDP payload.

According to one embodiment illustrated in FIG. 24, the system provides the broadcast protocols and parameters via in-band signaling in the broadcast stream. The broadcast stream 2400 contains the broadcast content and is transmitted on the broadcast channel, such as broadcast channel 2310 of FIG. 23. Interspersed throughout the broadcast stream 2400 are SDP 2402.

Figure 25:
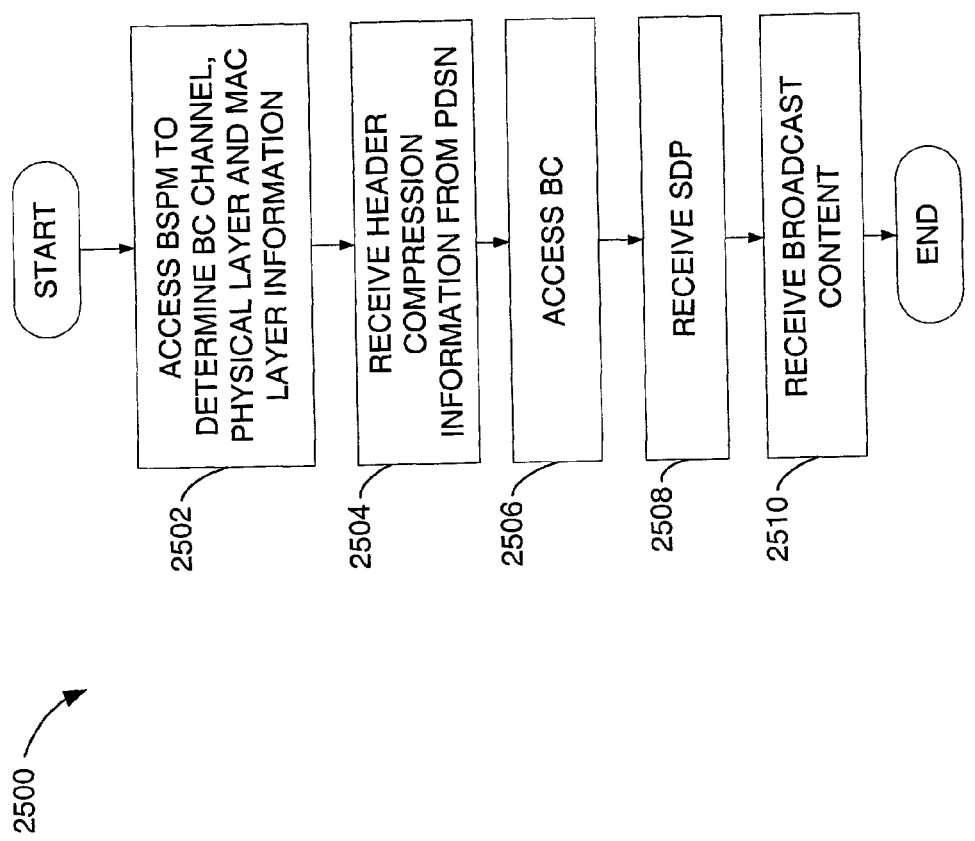
FIG. 25 is a method for accessing a broadcast service in a wireless communication system.

FIG. 25 illustrates a method 2500 of providing broadcast service parameter and protocol information using an in-band method, wherein the overhead type information is provided with the broadcast content on the broadcast channel. The term in-band is intended to indicate that overhead type information is provided on the same channel as the broadcast content and thus does not require a separate transmission mechanism, i.e., channel. The method 2500 first accesses the BPSM at step 2502. The MS 210 extracts the broadcast channel information, the physical layer information, and the MAC layer information from the BSPM. Header compression information is received directly from the PDSN 206 at step 2504. This can be done by either having the MS 210 directly contact the PDSN 206 via a packet data service option (out-of-band) or by having the PDSN 206 insert the header compression configuration information into the broadcast stream to the MS 210. At step 2506 the MS 210 accesses the Broadcast Content (BC). In response to receipt of the header compression information, the MS 210 is able to receive the SDP transmitted on the broadcast channel with the broadcast content at step 2508. The SDP contains parameters and protocols for receiving the associated broadcast session. The MS 210 applies the information contained in the SDP to receive, decode, and process broadcast content received on the broadcast channel at step 2510.

Figure 26:
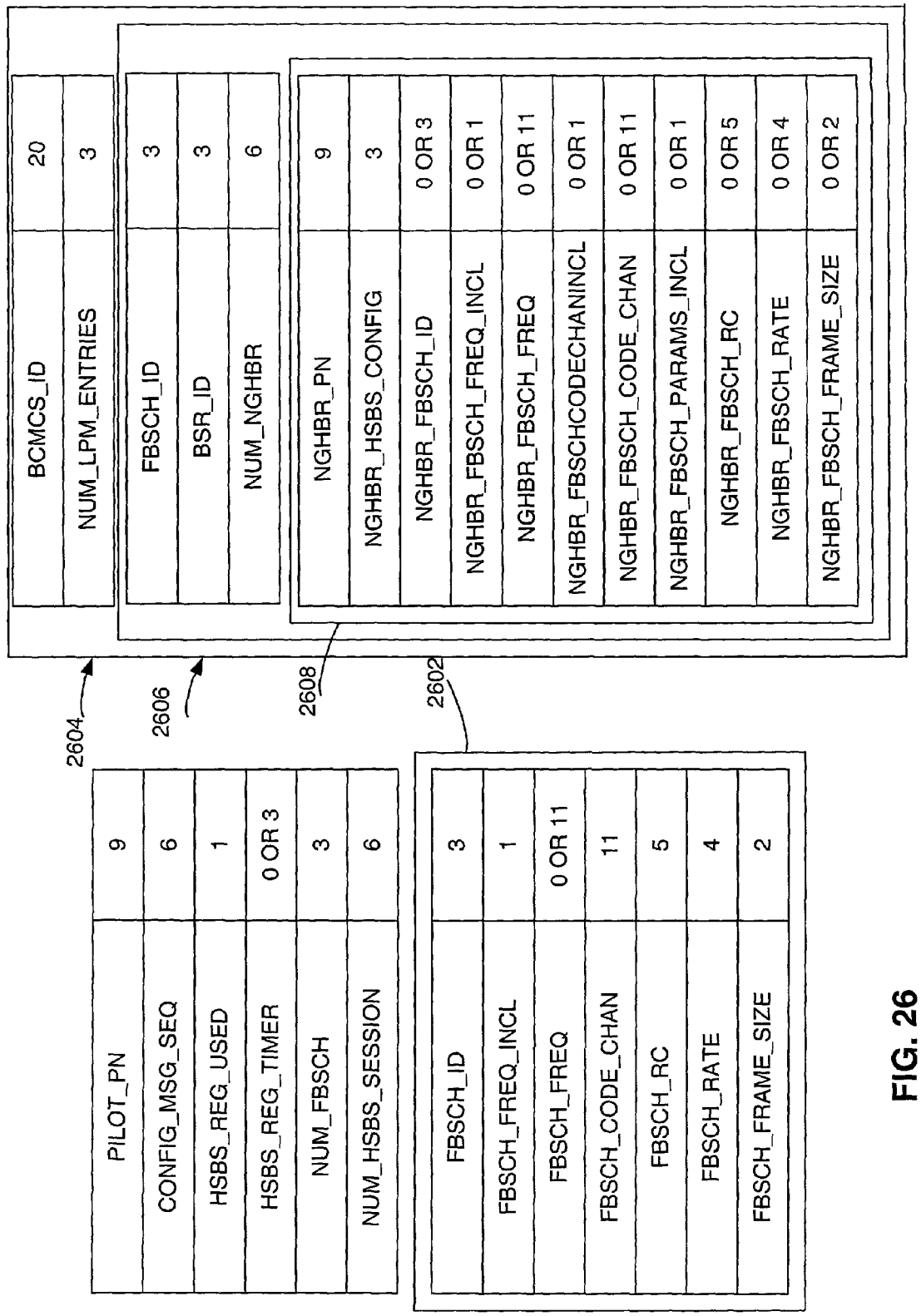
FIG. 26 is a block diagram of an embodiment of a BSPM.

The format of the BSPM of the exemplary embodiment is illustrated in FIG. 26. The various parameters indicated in the message are listed with the number of bits allocated in the message for each. The pilot PN sequence offset index is identified as PILOT_PN. The BS sets the PILOT_PN field to the pilot PN sequence offset for the corresponding BS in units of 64 PN chips. The CONFIG_MSG_SEQ refers to a broadcast service parameters message sequence number. When any of the parameters identified in a current BSPM have changed since the previous transmission of the BSPM, the BS increments the CONFIG_MSG_SEQ. The HSBS_REG_USED is a broadcast service registration used indicator. The BS may set this field to "1" to enable MS broadcast service registration or to "0" to disable MS broadcast service registration. The HSBS_REG_TIMER is a broadcast service registration timer value. If the field HSBS_REG_USED is set to '0', the BS omits this field. Else, the BS includes this field with significance given as: the BS sets this field to the length of the registration duration for the broadcast service channels; or the BS sets this field to '00000' if the MS is required to register the HSBS channel each time it starts to monitor a HSBS channel.

Continuing with FIG. 26, the NUM_FBSCH is the number of forward broadcast supplemental channels. The BS sets this field to the number of forward broadcast supplemental channels transmitted by the corresponding BS. The NUM_HSBS_SESSION is a number of broadcast service sessions. The BS sets this field to the number of broadcast service sessions being transmitted by the corresponding BS.

The BS includes NUM_FBSCH occurrences of the following variable length record 2602. The NUM_FBSCH variable length record 2602 may include an FBSCH_ID field that is the forward broadcast supplemental channel identifier. The BS sets this field to the identifier corresponding to this forward broadcast supplemental channel. Each F-BSCH channel within a sector has a unique identifier.

The FBSCH_FREQ_INCL is the frequency included indicator. If this F-BSCH channel resides in the same frequency as where this message is being transmitted, the BS sets this field to '0'; otherwise, the BS sets this field to '1'. The FBSCH_FREQ field is the frequency assignment of the forward broadcast supplemental channel. If the FBSCH_FREQ_INCL field is set to '0', the BS omits this field; otherwise, the BS includes this field and sets it to the CDMA channel number corresponding to the CDMA frequency assignment for the CDMA channel containing this forward broadcast supplemental channel.

The FBSCH_CODE_CHAN is a code channel index of the forward broadcast supplemental channel, wherein the BS sets this field to the code channel index that the MS is to use on the forward broadcast supplemental channel. The FBSCH_RC is a radio configuration of the forward broadcast supplemental channel, wherein the BS sets this field to the radio configuration to be used by the MS on the forward broadcast supplemental channel.

The FBSCH_RATE is the data fate of the forward broadcast supplemental channel, wherein the BS sets this field to the data rate used on the forward broadcast supplemental channel. The FBSCH_FRAME_SIZE is the frame size of the forward broadcast supplemental channel, wherein the BS sets this field to the frame size on the forward broadcast supplemental channel.

The BS includes NUM_HSBS_SESSION occurrences of the following variable length record 2604. The NUM_HSBS_SESSION variable length record 2604 may include the BCMCS_ID field that is a broadcast service session identifier. The BS sets this field to the BCMCS_ID corresponding to this broadcast service session.

The NUM_LPM_ENTRIES are the number of logical-to-physical mapping entries. The BS sets this field to the number of logical, i.e., broadcast service sessions, to physical, i.e. forward broadcast supplemental channel, mapping entries carried in this message.

The BS includes NUM_LPM_ENTRIES occurrences of the following record 2606. The FBSCH_ID is the forward broadcast supplemental channel identifier, wherein the BS sets this field to the identifier corresponding to the forward broadcast supplemental channel on which the above broadcast service session is being carried.

The BSR_ID is a broadcast service reference identifier, wherein the BS sets this field to the broadcast service reference identifier corresponding to this broadcast service session on this forward broadcast supplemental channel.

NUM_NGHBR is the number of neighbor BSs. The BS sets this field to the number of neighbor BSs included in this message.

The BS includes NUM_NGHBR occurrences of the following variable length record 2608. NGHBR_PN is the neighbor pilot PN sequence offset index. The BS sets this field to the pilot PN sequence offset for this neighbor BS, in units of 64 PN chips. The NGHBR_HSBS_CONFIG field is the neighbor broadcast service configuration. The BS sets this field as specified in FIG. 27 to indicate the configuration of this HSBS session in this neighbor BS. NGHBR_FBSCH_ID is the neighbor forward broadcast supplemental channel identifier. If the NGHBR_HSBS_CONFIG field is set to '000', the BS omits this field; otherwise, the BS includes this field and sets it as follows. The BS sets this field to the identifier corresponding to this forward broadcast supplemental channel in the neighbor BS. Each F-BSCH channel within a sector has a unique identifier.

The NGHBR_FBSCH_FREQ_INCL field is the neighbor frequency included indicator. If the NGHBR_HSBS_CONFIG field is set to '000', or '010', the BS omits this field; otherwise, the BS includes this field and sets it as follows. If this F-BSCH channel in the neighbor BS resides in the same frequency as in this BS, the BS sets this field to '0'; otherwise, the BS sets this field to '1'.

NGHBR_FBSCH_FREQ is the frequency assignment of the forward broadcast supplemental channel in the neighbor BS. If the NGHBR_FBSCH_FREQ_INCL field is not included in this message or is included and is set to '0', the BS omits this field; otherwise, the BS includes this field and sets it as follows. The BS sets this field to the CDMA Channel number corresponding to the CDMA frequency assignment for the CDMA Channel containing this forward broadcast supplemental channel in this neighbor BS.

NGHBR_FBSCHCODECHANINCL is the neighbor pilot forward broadcast supplemental channel code channel index included indicator. If the NGHBR_HSBS_CONFIG field is set to '000', the BS omits this field; otherwise, the BS includes this field and sets it as follows. If this F-BSCH channel in the neighbor BS uses the same code channel as in this BS, the BS sets this field to '0'; otherwise, the BS sets this field to '1'.

The NGHBR_FBSCH_CODE_CHAN field is the neighbor pilot forward broadcast supplemental channel code channel index. If the NGHBR_FBSCHCODECHANINCL field is not included in this message or is included and is set to '0', the BS omits this field; otherwise, the BS includes this field and sets it as follows. The BS sets this field to the code channel index that the MS is to use for this forward broadcast supplemental channel on this neighbor BS.

NGHBR_FBSCH_PARAMS_INCL is the neighbor forward broadcast supplemental channel parameters included indicator. If the NGHBR_HSBS_CONFIG field is set to '000', or '010', the BS omits this field; otherwise, the BS includes this field and sets it as follows. If this F-BSCH channel in the neighbor BS uses the same physical layer parameters as in this BS, the BS sets this field to '0'; otherwise, the BS sets this field to '1'.

The NGHBR_FBSCH_RC field is the radio configuration of the forward broadcast supplemental channel in the neighbor BS. If the NGHBR_FBSCH_PARAMS_INCL field is not included in this message or is included and is set to '0', the BS omits this field; otherwise, the BS includes this field and sets it as follows. The BS sets this field to the radio configuration to be used by the MS for this forward broadcast supplemental channel in this neighbor BS.

NGHBR_FBSCH_RATE is the data rate of the forward broadcast supplemental channel in the neighbor BS. If the NGHBR_FBSCH_PARAMS_INCL field is not included in this message or is included and is set to '0', the BS omits this field; otherwise, the BS includes this field and sets it as follows. The BS sets this field to the data rate of this forward broadcast supplemental channel in this neighbor BS.

NGHBR_FBSCH_FRAME_SIZE is the frame size of the forward broadcast supplemental channel in the neighbor BS. If the NGHBR_FBSCH_PARAMS_INCL field is not included in this message or is included and is set to '0', the BS omits this field; otherwise, the BS includes this field and sets it as follows. The BS sets this field to the frame size used on this forward broadcast supplemental channel in this neighbor BS.

If the NGHBR_FBSCH_PARAMS_INCL field is not included in this message or is included and is set to '0', the BS omits this field; otherwise, the BS includes this field and set it as follows. The BS sets this field to indicate the frame repetition scheme being used on this forward broadcast supplemental channel in this neighbor BS.

Please note that in the exemplary BSPM as shown in FIG. 26, repeating records sometimes include other repeating records. For example, there are NUM_HSBS_SESSION occurrences of the NUM_HSBS_SESSION variable length record 2604. The NUM_HSBS_SESSION variable length record 2604 includes NUM_LPM_ENTRIES occurrences of another record 2606, which includes NUM_NGHBR occurrences of a yet further variable length record 2608.

The protocol options that would require negotiation between the transmitter and the receiver are selected and defined in the service option description. The MS uses the SO number sent in the BSPM to discover the protocol options of the broadcast service. In contrast to a unidirectional packet data service wherein the SO specifies the protocols up to the IP network layer, the broadcast service specifies protocols up to the application layer. The security layer uses the encryption and authentication algorithms communicated during the establishment of a security association, e.g., via out-of-band means.

In the exemplary embodiment, the transport layer is specified in the SO as the applied transport protocol, such as RTP, may not be readily identified as the payload of the UDP packets. The SO will also specify a UDP port number for the RTP payload to distinguish this from other types of UDP traffic that may be sent over the broadcast channel.

The application layer is also specified in the SO as many audio and video codecs (e.g., MPEG-4 and EVRC) do not have static RTP payload types that are readily identified by the mobile station. In a unidirectional broadcast application, the RTP payload types for these codecs have to be dynamically assigned via call-set-up negotiation (e.g., using SIP, RTSP, etc.). Since the broadcast service desires to avoid such negotiation, the media decoders are preselected by the SO. Furthermore, since the audio and visual data may be carried in separate RTP packets, it is desired to specify the RTP payload types to be used by each media stream.

In the exemplary embodiment, the logical-to-physical mapping specifies the HSBS channel (HSBS_ID/BSR_ID) carried in a corresponding F-BSCH (FBSCH_ID). The set {HSBS_ID, BSR_ID, FBSCH_ID} completely specifies (for the MS) where to find and listen to a given broadcast service. As such, the logical-to-physical mapping information is transmitted over the air to the MSs such that an MS desiring to access a given HSBS channel may determine the F-BSCH channel to monitor. Therefore, the following information is transmitted to the MS over the air interface: broadcast physical channel parameters; broadcast logical channel parameters; and logical-to-physical mapping.

As stated above, when the MS moves from sector A to sector B the MS needs to determine the relationship between the BCMCS_IDs transmitted in sector A and the BCMCS_IDs transmitted in sector B in order to properly handle the broadcast service it is currently monitoring. The following describes such BCMCS_ID related handoff issues.

Referring to the embodiment where the BCMCS_ID is globally unique, the handoff procedures are straightforward. When the MS moves from sector A to sector B (refer to FIG. 20) one of the following may occur. If sector B transmits the same BCMCS_ID as sector A, then the MS may conclude that the broadcast service session transmitted by sector B is the same as sector A. If sector B does not transmit the same BCMCS_ID as sector A, then the MS can conclude that the broadcast service that it is currently monitoring cannot be continued in sector B.

Figures 27, 28:
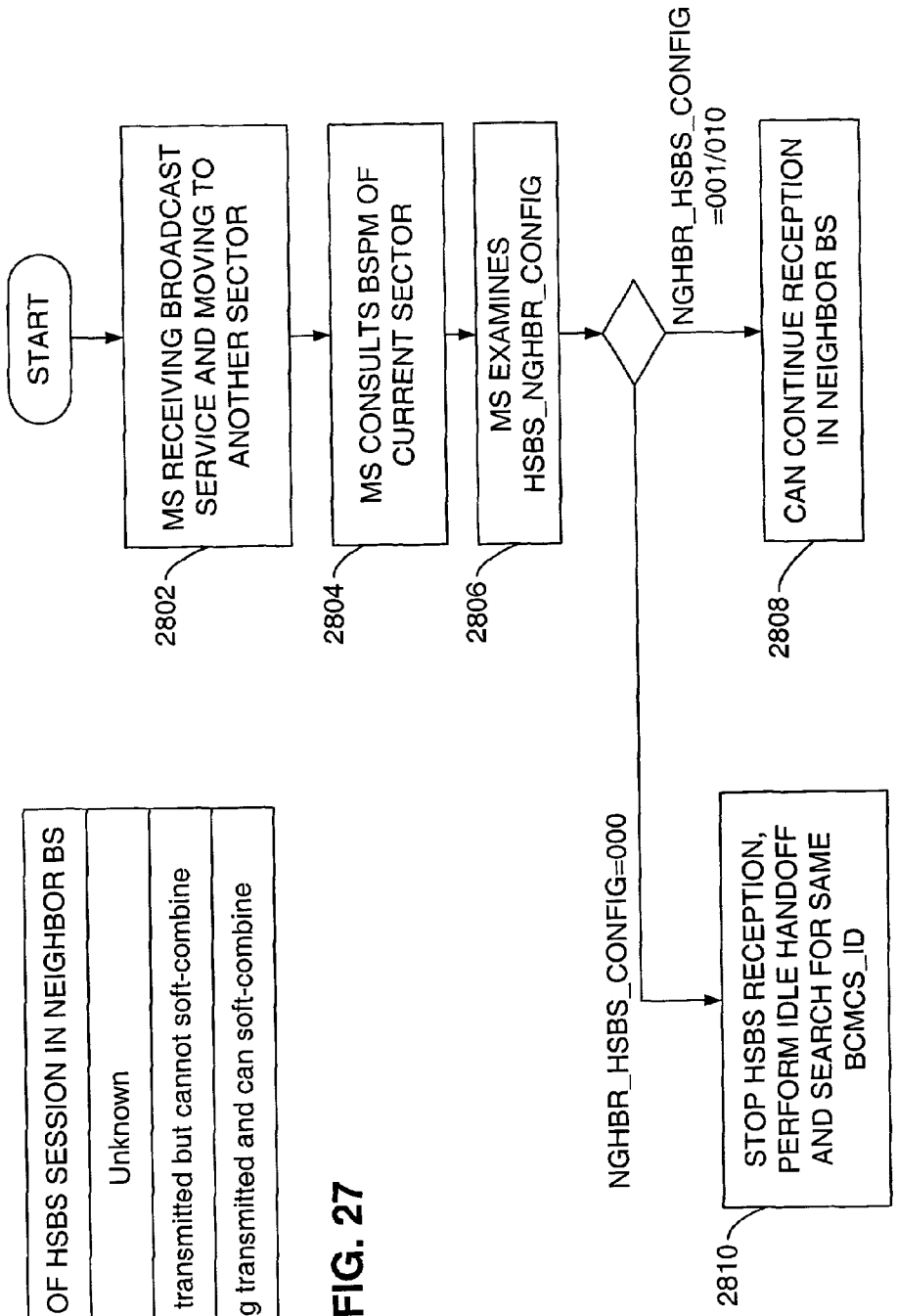
FIG. 27 is a table illustrating the values a BS may set the NGHBR_HSBS_CONFIG field to in order to indicate the configuration of a neighbor BS.
FIG. 28 is a flow diagram of the MS examining the value of HSBS_NGHBR_CONFIG received in the BSPM to determine handoff.

The BS may set the NGHBR_HSBS_CONFIG field as specified in FIG. 27 to indicate the configuration of this HSBS session in this neighbor BS. As a result, the MS may examine the value of HSBS_NGHBR_CONFIG received in the BSPM to determine handoff.

FIG. 28 illustrates a flow diagram of the MS examining the value of HSBS_NGHBR_CONFIG received in the BSPM to determine handoff. At step 2802 the MS is receiving broadcast service and is moving into another sector. The MS consults the BSPM of the current sector at step 2804. At step 2806 the MS examines HSBS_NGHBR_CONFIG. Depending upon the value of HSBS_NGHBR_CONFIG, the MS may perform the following. If HSBS_NGHBR_CONFIG is '000' (i.e. unknown), the MS stops 2810 HSBS reception and performs an idle handoff to the neighbor BS and searches for the same BCMCS_ID. If HSBS_NGHBR_CONFIG is '001/010' (i.e. service available in neighbor BS), the MS can continue 2808 reception in the neighbor BS.

In the embodiments where the BCMCS_ID is locally unique, the handoff procedures are more detailed because the MS may not know the relationship between BCMCS_IDs transmitted in different sectors. For locally unique BCMCS_IDs and handoff, there are three cases. The first case is where the broadcast service transmitted in the two sectors are not related to each other. One example of this would be two carriers with no roaming agreement. The second case is where the same broadcast service is available in both sectors, but the BCMCS_IDs used for the service in each sector are different. An example of this case is where a roaming agreement exists between carriers but they selected the BCMCS_IDs independently. The third case is where the same broadcast service is available in both sectors and the BCMCS_IDs used are identical. One example of this third case is where both sectors belong to the same carrier. Another example is where there is a roaming agreement between both carriers and they coordinated to select the same BCMCS_ID. In the second and third cases broadcast service reception can be continued in the new sector. In case one the broadcast service reception is terminated.

Because the MS cannot determine which of the above three cases applies as it crosses a sector boundary, the BS explicitly signals to the MS the relationship between BCMCS_IDs transmitted in both sectors. This information can be carried in the BSPM transmitted in each sector.

Recall that the BSPM, shown in FIG. 26, sent by a given BS contains information about HSBS sessions in each of its neighbor BSs. Specifically, for each logical-to-physical mapping of BCMCS_ID being transmitted in the current BS, the neighbor info listed in the BSPM contains NUM_NGHBR occurrences of NGHBR_PN and NGHBR_HSBS_CONFIG. The information in the BSPM may be enhanced to include information on whether the neighbor BS uses the same BCMCS_ID for this session. Two new fields may be included in the BSPM: NGHBR_BCMCS_ID_MAPPING_INCL 2902 and NGHBR_BCMCS_ID 2904. FIG. 29 illustrates where these fields may be placed in the BSPM.

When NGHBR_HSBS_CONFIG is set to '000' (i.e. Unknown), the current BS is not knowledgeable about the neighbor BS HSBS setup. As such, the MS assumes there is no relation between the BCMCS_IDs transmitted on the neighbor BS with respect to those transmitted on the current BS. Thus, the field NGHBR_BCMCS_ID_MAPPING_INCL is not included in this case.

When NGHBR_HSBS_CONFIG equals '001 (i.e. being transmitted but cannot soft-combine), the field NGHBR_BCMCS_ID_MAPPING_INCL is included and is set as follows. If the neighbor BS is using the same BCMCS_ID value for this session, then set it to '0'. If the neighbor BS is using a different BCMCS_ID value for this session, then set it to '1' and include the NGHBR_BCMCS_ID corresponding to this session.

When NGHBR_HSBS_CONFIG equals '010 (i.e. being transmitted and can soft-combine), then all parameters on the neighbor BS are identical to the current BS since soft-combining is allowed. Thus, the MS assumes the same BCMCS_ID is used in the neighbor BS for this HSBS session. The field NGHBR_BCMCS_ID_MAPPING_INCL is not included in this case.

Figure 30:
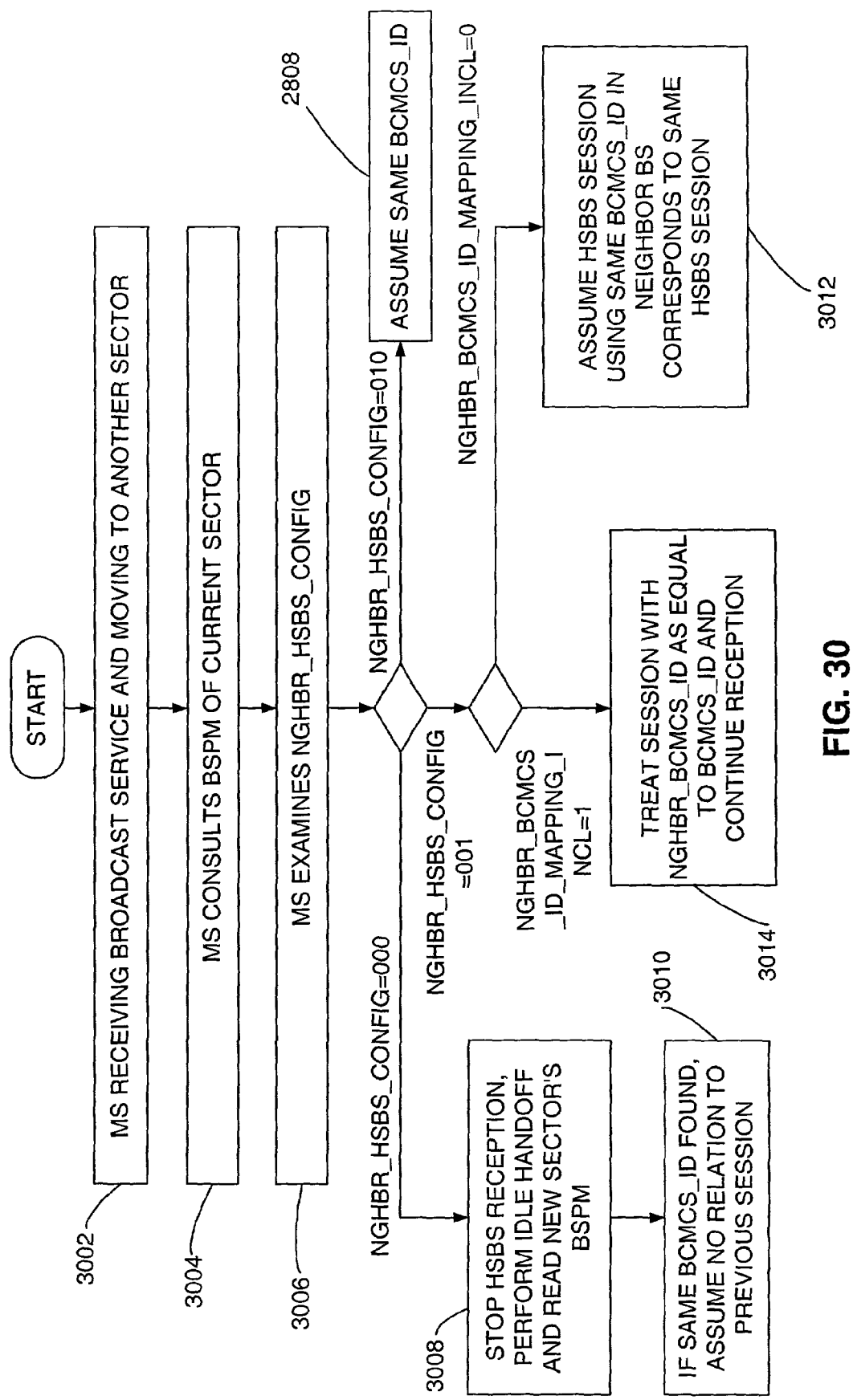
FIG. 30 is a flow diagram illustrating a method for an MS to process BCMCS_IDs during handoff.

FIG. 30 is a flow diagram illustrating a method for an MS to process BCMCS_IDs during handoff. At step 3002 the MS is receiving broadcast service and is moving into another sector. The MS consults the BSPM of the current sector at step 3004. At step 3006 the MS examines NGHBR_HSBS_CONFIG. Depending upon the value of NGHBR_HSBS_CONFIG, the MS may perform the following.

If NGHBR_HSBS_CONFIG=000, the MS may stop 3008 reception and perform an idle handoff to the neighbor BS, and then read the new sector's BSPM. If the same BCMCS_ID is found on the neighbor BS, the MS assumes 3010 there is no relation to the HSBS session with same BCMCS_ID in previous BS.

If NGHBR_HSBS_CONFIG=001, then the MS examines the value for NGHBR_BCMCS_ID_MAPPING_INCL. NGHBR_BCMCS_ID_MAPPING_INCL=0, the MS assumes 3012 that an HSBS session using the same BCMCS_ID in the neighbor BS corresponds to the same HSBS session. If NGHBR_BCMCS_ID_MAPPING_INCL=1, upon performing handoff to the neighbor BS, the MS treats 3014 the session with NGHBR_BCMCS_ID as being equal to the session with BCMCS_ID and continues reception across handoff. The MS may need to update the upper layer service instance of the new NGHBR_BCMCS_ID (since the upper layer also uses the BCMCS_ID for other purposes such as security).

If NGHBR_HSBS_CONFIG=010, then the MS assumes 3016 the same BCMCS_ID is used in the neighbor BS.

As described herein, the foregoing scheme provides several advantages. HSBS session continuation is possible even if the BCMCS_ID used by two carriers are not identical. In addition, carriers can define BCMCS_ID boundaries as they please. This provides carriers flexibility in reusing values in the face of BCMSC_ID shortages. Finally, the MS does not need to be concerned about crossing a carrier boundary. That is, the MS doesn't have to pay attention to SID/NID changes, etc.

Note that in the mechanism described above, explicit signaling about the BCMCS_ID relationships needs to be transmitted from each sector. If this is considered undesirable, then the following approach may be taken. The MS assumes that the HSBS session is provided only within the carrier's network, where the carrier's network is identified by the System ID in the BCMCS_ID definition. That is, in the BCMCS_ID format shown in FIG. 18, if the System_ID is different in the neighbor BS, the MS stops reception of the HSBS session. Whenever the MS performs handoff to another carrier network, the MS discontinues HSBS reception even if the new carrier has a session with the same BCMCS_ID.

One disadvantage of this alternative scheme is that, even if the neighbor carrier has the same service, the MS cannot continue reception. Furthermore, even within the same carrier, there may be a different System_ID used in different geographic regions. In this case, HSBS reception continuation may not be possible even within the same carrier.

The following describes handoff procedures for the embodiments where the BCMCS_ID may be either locally or globally unique. As described in relation to FIGS. 17-19, the BCMCS_ID may be either globally unique or locally unique as indicated by the global indicator 1704. The handoff issues in this case are similar to the handoff issues for services using globally-unique BCMCS_IDs and similar to handoff issues for services using locally-unique BCMCS_IDs.

The rules for the BS setting the NGHBR_BCMCS_ID_MAPPING_INCL and NGHBR_BCMCS_ID fields of the BSPM may be similar to the methods described above in relation to FIG. 29 with the following addition: the NGHBR_BCMCS_ID_MAPPING_INCL field may be omitted from the BSPM for globally-unique BCMCS_IDs.

Figure 31:
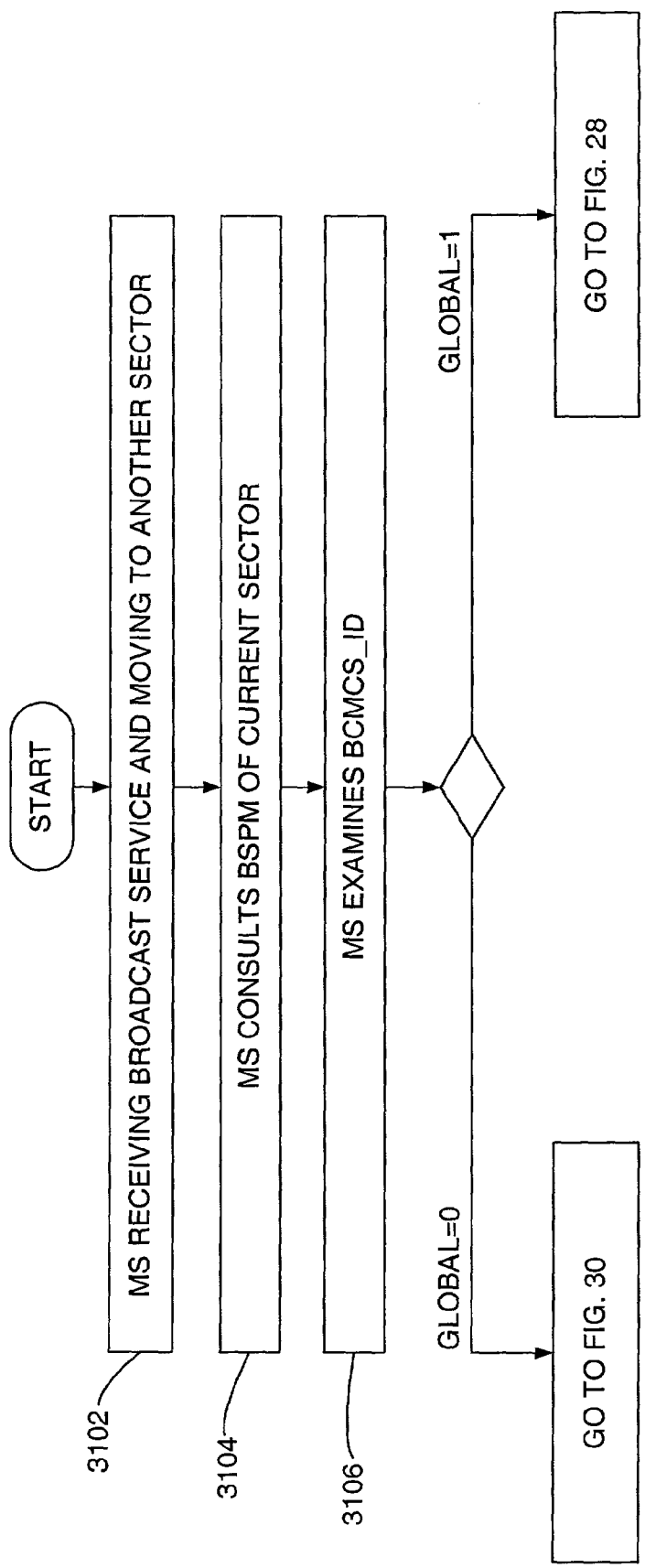
FIG. 31 is a flow diagram illustrating a method for an MS to process BCMCS_IDs during handoff.

FIG. 31 illustrates an embodiment of a method for the MS to process the BSPM with respect to the BCMCS_IDs. At step 3102 the MS is receiving broadcast service and is moving into another sector. The MS consults the BSPM of the current sector at step 3104. At step 3106 the MS examines dual BCMCS_ID to determine whether it is globally unique or locally unique. If the MS determines that the BCMCS_ID is globally unique, then MS follows the steps as outlined in FIG. 28 to handle the broadcast service across handoff. If the MS determines that the BCMCS_ID is not globally unique, then MS follows the steps as outlined in FIG. 30 to handle the broadcast service across handoff. Note that the alternative mechanism described for locally unique BSMCS_IDs is applicable to the locally-unique BCMCS_IDs in this embodiment as well.

Certain procedures may be used if mapping between globally-unique and locally-unique BCMCS_IDs is allowed. Note that in the flow diagram and description relating to FIG. 31, it is assumed that a given broadcast service is provided via either a globally-unique BCMCS_ID or a locally-unique BCMCS_ID but not both. If such a flexibility were allowed (that is, carrier A uses a locally-unique BCMCS_ID whereas other carriers use a globally-unique BCMCS_ID), then mapping between globally-unique and locally-unique BCMCS_IDs should be allowed in the BSPM to facilitate service continuation across handoff. In this case, the NGHBR_BCMCS_ID_MAPPING_INCL field may be included in the BSPM even for globally-unique BCMCS_IDs since the neighbor sector may be using a locally-unique BCMCS_ID to carry the same broadcast service. Note that since the MS does not know whether a given sector boundary involves such a mapping, the MS assumes such a possibility in every sector. As such the NGHBR_BCMCS_ID_MAPPING_INCL field needs to be added in BSPM for globally-unique BCMCS_IDs in every sector. This can be improved slightly by including a single indicator in BSPM that indicates whether such mapping applies to this sector. Such an indicator, referred to as GLOBAL_LOCAL_MAPPING_IND, may easily be included in the BSPM. If this indicator is set to '0', then the MS assumes the NGHBR_BCMCS_ID_MAPPING_INCL field is not included in BSPM for any of the globally-unique BCMCS_IDs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of broadcasting, comprising:
providing a service ID from an issuer to identify a broadcast service wherein the service ID uniquely identifies a broadcast service among one or more broadcast services from a common content server on a common radio channel, and further identifies availability of the broadcast service in an adjacent sector, wherein the broadcast service has a service name, wherein the service ID is a globally unique service ID issued by a global issuer, wherein the service ID comprises a BCMDS_ID, and wherein an IP multicast address and UDP port number are associated with the BCMCS_ID;
sending the service ID from the content server to a base station, wherein the content server is not an adjacent sector base station;
configuring a broadcast service parameters message at the base station that includes the service ID;
transmitting the broadcast service parameters message to a mobile station; and
using the service ID in the broadcast service parameters message at the mobile station to determine the availability of the broadcast service in the adjacent sector.

2. The method as in claim 1, further comprising requesting by the content server the service ID from a global issuer.

3. The method as in claim 1, further comprising dynamically generating a BCMCS_ID and associating a lifetime value with the BCMCS_ID.

4. A method of broadcasting, comprising:
dynamically generating a BCMCS_ID and associating a lifetime value with the BCMCS_ID;
providing a service ID from an issuer to identify a broadcast service, wherein the broadcast service has a service name, wherein the service ID uniquely identifies a broadcast service among one or more broadcast services from a common content server on a common radio channel, and further identifies availability of the broadcast service in an adjacent sector, wherein the service ID is a locally unique service ID issued by a local issuer and comprises the BCMDS_ID, wherein the an IP multicast address and UDP port number are associated with the BCMCS_ID;
sending the service ID from the content server to a base station, wherein the content server is not an adjacent sector base station;
configuring a broadcast service parameters message at the base station that includes the service ID;
transmitting the broadcast service parameters message to a mobile station; and
using the service ID in the broadcast service parameters message at the mobile station to determine the availability of the broadcast service in the adjacent sector.

5. The method as in claim 4, further comprising requesting by the content server the service ID from the local issuer.

6. The method as in claim 1, wherein the BCMCS_ID is a dual BCMCS_ID comprising a global indicator to indicate uniqueness of the BCMCS_ID.

7. A method of broadcasting from a base station, comprising:
receiving from an issuer via at least one content server a first broadcast service identified by a first service ID, wherein the first service ID uniquely identifies a broadcast service among one or more broadcast services from at least one content server on a common radio channel;
receiving via at least one content server from the issuer a second service ID that identifies a second broadcast service received by a neighboring base station sector, wherein the second service ID uniquely identifies a broadcast service among one or more broadcast services from at least one content server on a common radio channel, wherein the first service ID comprises a first BCMCS_ID and wherein the second service ID comprises a second BCMCS_ID, and wherein an IP multicast address and UDP port number are associated with the first BCMCS_ID;
configuring neighbor configuration data that relates to the second broadcast service;
configuring a broadcast service parameters message that includes the second service ID and the neighbor configuration data; and
transmitting the broadcast service parameters message to a mobile station currently receiving the first broadcast service.

8. The method as in claim 7, wherein the first service ID was provided by a global issuer.

9. The method as in claim 7, wherein the first service ID is a globally unique service ID issued by a global issuer.

10. The method as in claim 7, wherein the first service ID has an associated lifetime value.

11. A method of broadcasting from a base station, comprising:
receiving from an issuer via at least one content server a first broadcast service identified by a first service ID, wherein the first service ID uniquely identifies a broadcast service among one or more broadcast services from at least one content server on a common radio channel, wherein the first service ID is a locally unique service ID issued by a local issuer, wherein the first service ID comprises a first BCMCS_ID, and wherein an IP multicast address and UDP port number are associated with the first BCMCS_ID;
configuring neighbor configuration data that relates to the second broadcast service;
configuring a broadcast service parameters message that includes the second service ID and the neighbor configuration data; and
transmitting the broadcast service parameters message to a mobile station currently receiving the first broadcast service.

12. The method as in claim 7, wherein the first BCMCS_ID is a dual BCMCS_ID comprising a global indicator to indicate uniqueness of the first BCMCS_ID.

13. A method of receiving a broadcast at a mobile station, comprising:
receiving a first broadcast service identified by a first service ID from a first base station sector, wherein the first service ID is a globally unique service ID issued by a global issuer, and wherein the first service ID uniquely identifies a broadcast service among one or more broadcast services from a content server on a common radio channel;
receiving a broadcast service parameters message that includes a second service ID, wherein the second service ID uniquely identifies a broadcast service among one or more broadcast services from a content server on a common radio channel, and neighbor configuration data, wherein the second service ID identifies a second broadcast service available from a second base station sector, the first and second service IDs being received via a content server from a common issuer, wherein the first service ID comprises a first BCMCS_ID and wherein the second service ID comprises a second BCMCS_ID, and wherein an IP multicast address and UDP port number are associated with the first BCMCS_ID;
examining the neighbor configuration data that relates to the second broadcast service; and
determining, based on the neighbor configuration data, whether the first service ID and the second service ID identify the same broadcast content whereby reception of the broadcast content is continued in the second base station sector.

14. The method as in claim 13, wherein the first service ID was provided by a global issuer.

15. The method as in claim 13, wherein the first BCMCS_ID has an associated lifetime value.

16. The method as in claim 13, wherein the first service ID is a locally unique service ID issued by a local issuer.

17. The method as in claim 13, wherein the first BCMCS_ID is a dual BCMCS_ID comprising a global indicator to indicate uniqueness of the first BCMCS_ID.

18. The method as in claim 1, wherein the content server sends the service ID to the base station via a Packet Data Serving Node.

19. The method as in claim 1, wherein the content server comprises a web server configured to serve video and audio to one or more users via user browsers.

20. The method as in claim 1, the method further comprising transmitting a service name to the base station, wherein the service name includes alphabetic characters and is configured to be read and interpreted by an end user.

21. The method as in claim 1, the method further comprising transmitting video content as a broadcast service to the base station.

22. The method as in claim 21, wherein the video content is transmitted using IP packets.

23. The method as in claim 1, the method further comprising providing multicast services from the content server on the same radio channel to the base station.

24. The method as in claim 7, the method further comprising receiving at the base station at least one service ID via a Packet Data Serving Node.

25. The method as in claim 7, the method further comprising receiving at the base station video content from at least one content server.

26. The method as in claim 7, the method further comprising identifying at the base station at least a first multicast service broadcast to the base station by different content servers.

27. The method as in claim 13, the method further comprising receiving at the mobile station from the first base station:
   a service name, wherein the service name includes alphabetic characters and is configured to be read and interpreted by an end user; and
   video content associated with the service name.

* * * * *